US009550138B2

(12) United States Patent
Bradford et al.

(10) Patent No.: US 9,550,138 B2
(45) Date of Patent: Jan. 24, 2017

(54) GRAVITY FLUID/WATER FILTER SYSTEM

(71) Applicant: Whirlpool Corporation, Benton Harbor, MI (US)

(72) Inventors: Scott Hugh Bradford, Gavirate (IT); Marco Casucci, Varese (IT); David P. Cooper, Kalamazoo, MI (US); Nihat O. Cur, Stevensville, MI (US); Beth M. Jackson, St. Joseph, MI (US); Timothy A. Kee, Stevensville, MI (US); James W. Kendall, Mt. Prospect, IL (US); Italo Renzo Menegon, Brenta (IT); Verne H. Myers, Benton Harbor, MI (US); Ginger Elayne Patera, St. Joseph, MI (US); Mark M. Senninger, St. Joseph, MI (US); Gordon Jay Stannis, Saugatuk, MI (US); Sara Manfredini-Taube, Varese (IT); Torsten Rickard Mathias-Tingstrom, Ispra (IT); Joel Graham Vanfaasen, Holland, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 334 days.

(21) Appl. No.: 14/095,237

(22) Filed: Dec. 3, 2013

(65) Prior Publication Data
US 2014/0151304 A1   Jun. 5, 2014

Related U.S. Application Data

(60) Provisional application No. 61/733,020, filed on Dec. 4, 2012.

(51) Int. Cl.
*B01D 35/30* (2006.01)
*B01D 15/10* (2006.01)
(Continued)

(52) U.S. Cl.
CPC ............ *B01D 35/30* (2013.01); *B01D 15/10* (2013.01); *C02F 1/001* (2013.01); *C02F 1/003* (2013.01);
(Continued)

(58) Field of Classification Search
None
See application file for complete search history.

(56) References Cited

U.S. PATENT DOCUMENTS 651,948 A     6/1900 Lawson
1,536,890 A   5/1925 Lagemann
(Continued)

FOREIGN PATENT DOCUMENTS

EP   1354857 A1   10/2003
FR   2884829 A1   10/2003
(Continued)

OTHER PUBLICATIONS

International Patent Application No. PCT/US2013073118, filed Dec. 4, 2013, Applicant: Whirlpool Corporation, International Search Report and Written Opinion re: Same, mail date: Apr. 17, 2014.

(Continued)

*Primary Examiner* — Benjamin Kurtz

(57) ABSTRACT

A gravity-driven fluid filtering system that includes a universal fluid (typically water) filter and a plurality of differently sized fluid dispensing adapters. The universal fluid filter includes: at least one gravity-driven fluid filter media; a housing having an interior and at least one fluid inlet aperture configured to allow a fluid to be treated to enter the interior of the housing by a force of gravity and into contact with the at least one gravity-driven water filter media spaced within the interior of the housing; and at least one treated fluid outlet aperture configured to deliver treated fluid to at
(Continued)

least one of a plurality vessels each having a differently sized fluid receiving aperture. The plurality of differently sized fluid dispensing adapters each having a sloped and contoured fluid receiving portion, which is different for each adapter.

8 Claims, 31 Drawing Sheets

(51) Int. Cl.
*C02F 1/00* (2006.01)
*C02F 1/28* (2006.01)
*C02F 1/42* (2006.01)
*C02F 1/68* (2006.01)
*C02F 5/10* (2006.01)
*C02F 101/20* (2006.01)
*C02F 101/30* (2006.01)
*C02F 101/32* (2006.01)

(52) U.S. Cl.
CPC .................. *C02F 1/281* (2013.01); *C02F 1/42* (2013.01); *C02F 1/68* (2013.01); *C02F 5/10* (2013.01); *C02F 2101/20* (2013.01); *C02F 2101/306* (2013.01); *C02F 2101/322* (2013.01); *C02F 2307/04* (2013.01)

(56) References Cited

U.S. PATENT DOCUMENTS

| | | | |
|---|---|---|---|
| 1,674,203 | A | 6/1928 | Holz et al. |
| 3,823,824 | A | 7/1974 | Close |
| 4,072,243 | A | 2/1978 | Conant et al. |
| 4,283,283 | A | 8/1981 | Zimmerman |
| 4,419,235 | A | 12/1983 | Sway |
| 4,528,095 | A | 7/1985 | Byrne |
| 4,764,274 | A | 8/1988 | Miller |
| 4,828,692 | A | 5/1989 | Peranio |
| 4,867,875 | A | 9/1989 | Peranio |
| 4,948,499 | A | 8/1990 | Peranio |
| 4,999,109 | A | 3/1991 | Sabre |
| 5,049,272 | A | 9/1991 | Nieweg et al. |
| 5,318,703 | A | 6/1994 | Heiligman |
| 5,328,597 | A | 7/1994 | Boldt et al. |
| 5,393,548 | A | 2/1995 | Heiligman |
| 5,411,661 | A | 5/1995 | Heiligman |
| 5,652,008 | A | 7/1997 | Heiligman |
| 5,656,160 | A | 8/1997 | Parise et al. |
| 5,826,493 | A | 10/1998 | Tien Lin |
| 5,846,418 | A | 12/1998 | Thompson et al. |
| 5,914,045 | A | 6/1999 | Palmer et al. |
| 6,024,867 | A | 2/2000 | Parise |
| 6,074,550 | A | 6/2000 | Hofmann et al. |
| 6,238,552 | B1* | 5/2001 | Shannon .................. C02F 1/003 210/282 |
| 6,290,847 | B1 | 9/2001 | Cutler |
| 6,428,687 | B1 | 8/2002 | Moretto |
| 6,454,941 | B1 | 9/2002 | Cutler et al. |
| D496,429 | S | 9/2004 | Donnelly |
| 7,094,334 | B1 | 8/2006 | Guzman et al. |
| 7,163,625 | B1 | 1/2007 | Williamson et al. |
| 7,294,277 | B2 | 11/2007 | Moretto |
| 7,309,418 | B2 | 12/2007 | Joyce et al. |
| 7,585,409 | B2 | 9/2009 | Bommi et al. |
| D602,558 | S | 10/2009 | Beams et al. |
| 7,678,282 | B2 | 3/2010 | Moretto |
| D617,868 | S | 6/2010 | Leavitt et al. |
| 7,836,708 | B2 | 11/2010 | Krause et al. |
| 7,862,720 | B2 | 1/2011 | Brown |
| D657,844 | S | 4/2012 | Smiedt et al. |
| D666,865 | S | 9/2012 | Spivey et al. |
| 2005/0252929 | A1 | 11/2005 | Bond |
| 2006/0162806 | A1* | 7/2006 | Hengsperger ......... A47J 31/605 141/18 |
| 2007/0045302 | A1 | 3/2007 | Fujii et al. |
| 2008/0116146 | A1 | 5/2008 | Herrington et al. |
| 2009/0199722 | A1 | 8/2009 | Bodum |
| 2010/0044284 | A1 | 2/2010 | Scholz |
| 2010/0084347 | A1 | 4/2010 | Wilder et al. |
| 2011/0303589 | A1 | 12/2011 | Kuennen et al. |
| 2012/0055862 | A1 | 3/2012 | Parekh et al. |
| 2012/0148707 | A1 | 6/2012 | Lackey et al. |

FOREIGN PATENT DOCUMENTS

| | | |
|---|---|---|
| GB | 2196329 A | 4/1988 |
| GB | 2200902 A | 8/1988 |
| GB | 2441981 A | 3/2008 |
| RU | 45217 S | 3/1999 |
| WO | 9740906 | 11/1997 |
| WO | 2006110632 A2 | 10/2006 |
| WO | 2007021686 A2 | 2/2007 |
| WO | 2010010572 A2 | 1/2010 |
| WO | 2011013142 A2 | 2/2011 |

OTHER PUBLICATIONS

International Patent Application No. PCT/US2013073126, filed Dec. 4, 2013, Applicant: Whirlpool Corporation, International Search Report and Written Opinion re: Same, mail date: Apr. 17, 2014.
International Patent Application No. PCT/US2013073112, filed Dec. 4, 2013, Applicant: Whirlpool Corporation, International Search Report and Written Opinion re: Same, mail date: Apr. 17, 2014.
International Patent Application No. PCT/US2013073138, filed Dec. 4, 2013, Applicant: Whirlpool Corporation, International Search Report and Written Opinion re: Same, mail date: Apr. 17, 2014.
International Patent Application No. PCT/US2013073149, filed Dec. 4, 2013, Applicant: Whirlpool Corporation, International Search Report and Written Opinion re: Same, mail date: Apr. 17, 2014.
Drop Speaker, Zumreed, "Music with Style", Copyright 2010 Dreams, Inc.
Zumreed Rain Drop LED Bathroom Light, online article by Liszewski, Andrew on May 14, 2007, website www.OHGIZMO.com.
Zumreed Drop—Showering With Your Ipod., Copyright One Piece Discoveries Science and Tech Blog 2009-2010.
http://www.somawater.co/ (web page Dec. 2012).
http://www.kickstarter.com/projects/zachallia/soma-beautifully-innovative-all-natural-water-filt (web page Dec. 2012).

* cited by examiner

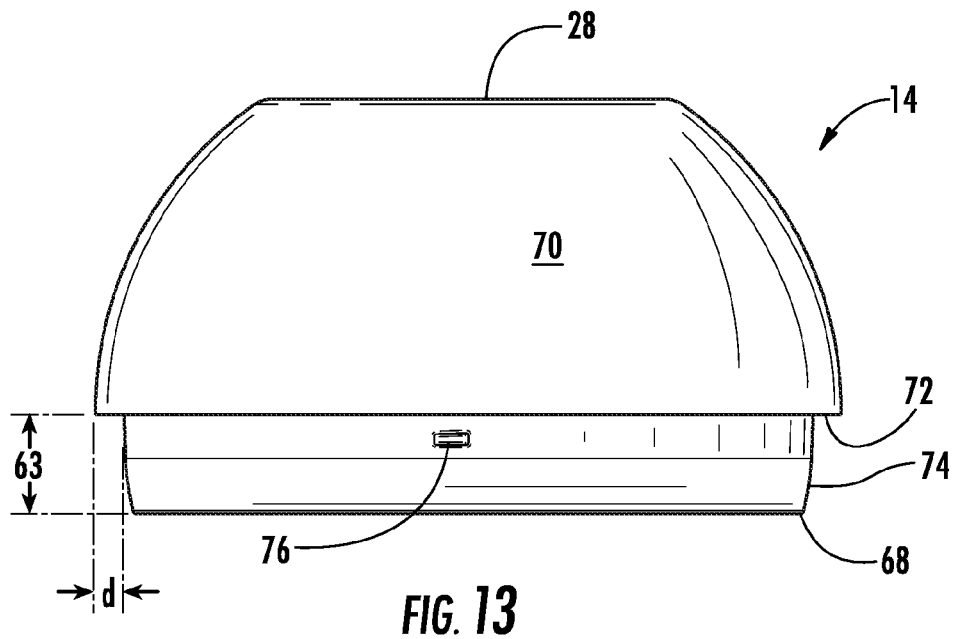
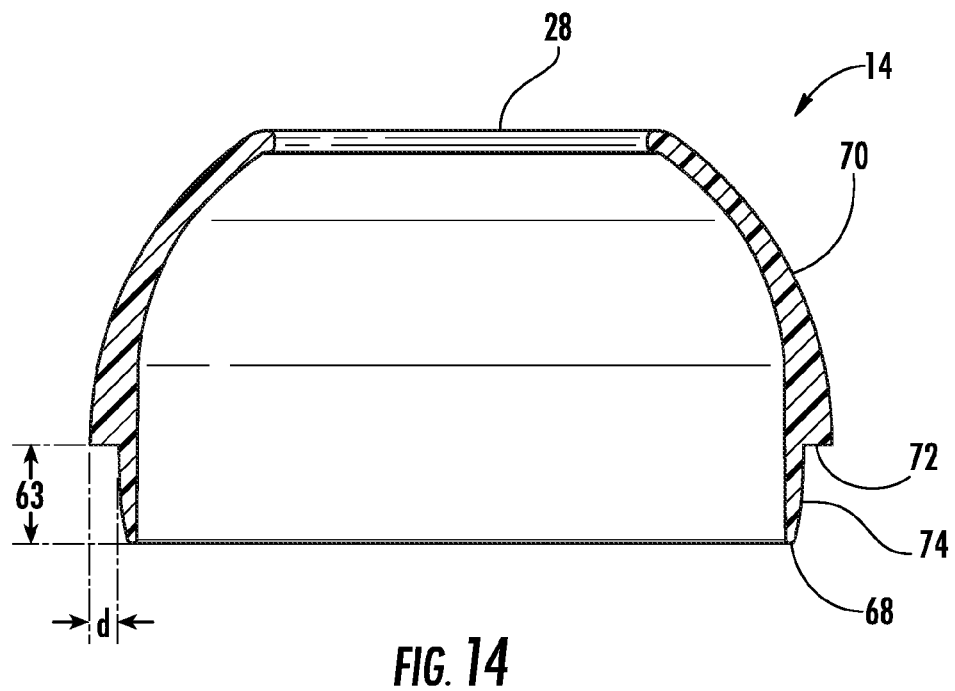

GRAVITY FLUID/WATER FILTER SYSTEM

CROSS-REFERENCE TO RELATED APPLICATION

This application claims priority to and the benefit of U.S. Provisional Patent Application Ser. No. 61/733,020, filed on Dec. 4, 2012, entitled Water Filtration/Treatment System, the entire disclosure of which is hereby incorporated by reference.

SUMMARY OF THE DISCLOSURE

An aspect of the present invention includes a gravity-driven fluid filtering system that includes a universal fluid (typically water) filter and a plurality of differently sized fluid dispensing adapters. The universal fluid filter includes: at least one gravity-driven fluid filter media; a housing having an interior and at least one fluid inlet aperture configured to allow a fluid to be treated to enter the interior of the housing by a force of gravity and into contact with the at least one gravity-driven water filter media spaced within the interior of the housing; and at least one treated fluid outlet aperture configured to deliver treated fluid to at least one of a plurality vessels each having a differently sized fluid receiving aperture. The plurality of differently sized fluid dispensing adapters each include a universal fluid filter engagement location and a sloped and contoured fluid receiving portion, which is different for each adapter, and spaced above the universal fluid filter engagement location of the universal fluid filter and wherein the sloped and contoured fluid receiving portion configured to engage a perimeter of a fluid receiving aperture of a given vessel and the interior of the sloped and contoured fluid receiving portion receives an untreated fluid prior to the fluid contacting the at least one gravity-driven filter media engaged with the adapter at the universal fluid filter engagement location.

Yet another aspect of the present invention includes gravity-driven fluid filtering system that includes a universal fluid (typically water) filter and a plurality of differently sized fluid dispensing adapters. The universal water filter typically includes: at least one gravity-driven water filter media; a housing having an interior, a top surface, a bottom surface and at least one perimeter wall extending between the top surface and the bottom surface. The top surface is planar and has a plurality of untreated water inlet apertures configured to allow untreated water to enter the interior of the housing by the force of gravity and into contact with the at least one gravity-driven water filter media spaced within the interior of the housing. The bottom surface is planar and has a plurality of treated water outlet apertures configured to deliver treated water therefrom. The plurality of differently sized fluid dispensing adapters each include an universal water filter engagement location and a sloped and contoured untreated water receiving portion, which is different for each adapter. The space above the engagement location of the universal fluid filter is a sloped and contoured untreated water receiving portion configured to engage a perimeter of the fluid receiving aperture of a given vessel. The top of the sloped and contoured fluid receiving portion is wider than the engagement location and the sloped and contoured fluid portion is a curvilinear exterior surface of the adapter. The water treatment medium is configured to treat water at a rate of at least about two liters per minute while removing at least chlorine odor and chlorine taste components from the water.

Another aspect of the present invention includes a method of using the gravity-driven water filtering system to treat untreated water and deliver treated water to the interior of a plurality of different vessels with intake apertures of at least two different sizes comprising the steps of: engaging a first adapter with a first vessel inlet of a first vessel; engaging a second adapter with a second vessel inlet of a second vessel; engaging a universal water filter with the first adapter; treating water by adding untreated water to the sloped and contoured untreated water receiving portion of the first adapter and allowing the untreated water to be treated by the at least one gravity-driven water filter media and into the first vessel's interior as gravity pulls the untreated water through the universal water filter and out the treated water outlet apertures of the first adapter; disengaging the universal water filter from the first adapter; engaging the universal water with the second adapter; and treating water by adding untreated water to the sloped and contoured untreated water receiving portion of the second adapter and allowing the untreated water to be treated by the at least one gravity-driven water filter media and into the second vessel's interior as gravity pulls the untreated water through the universal water filter and out the treated water outlet apertures of the second adapter. The universal water filter typically includes: at least one gravity-driven water filter media; a housing having an interior, a top surface, a bottom surface and at least one perimeter wall extending between the top surface and the bottom surface. The top surface is planar and has a plurality of untreated water inlet apertures configured to allow untreated water to enter the interior of the housing by the force of gravity and into contact with the at least one gravity-driven water filter media spaced within the interior of the housing. The bottom surface is planar and has a plurality of treated water outlet apertures configured to deliver treated water therefrom.

These and other features, advantages, and objects of the present disclosure will be further understood and appreciated by those skilled in the art by reference to the following specification, claims, and appended drawings.

BRIEF DESCRIPTION OF THE DRAWINGS

FIG. 13 is an elevated side view of the top cap portion according to an aspect of the present disclosure;

FIG. 14 is a cross-sectional view of the top cap taken along lines XIV-XIV in FIG. 12;

DETAILED DESCRIPTION

Figure 1:
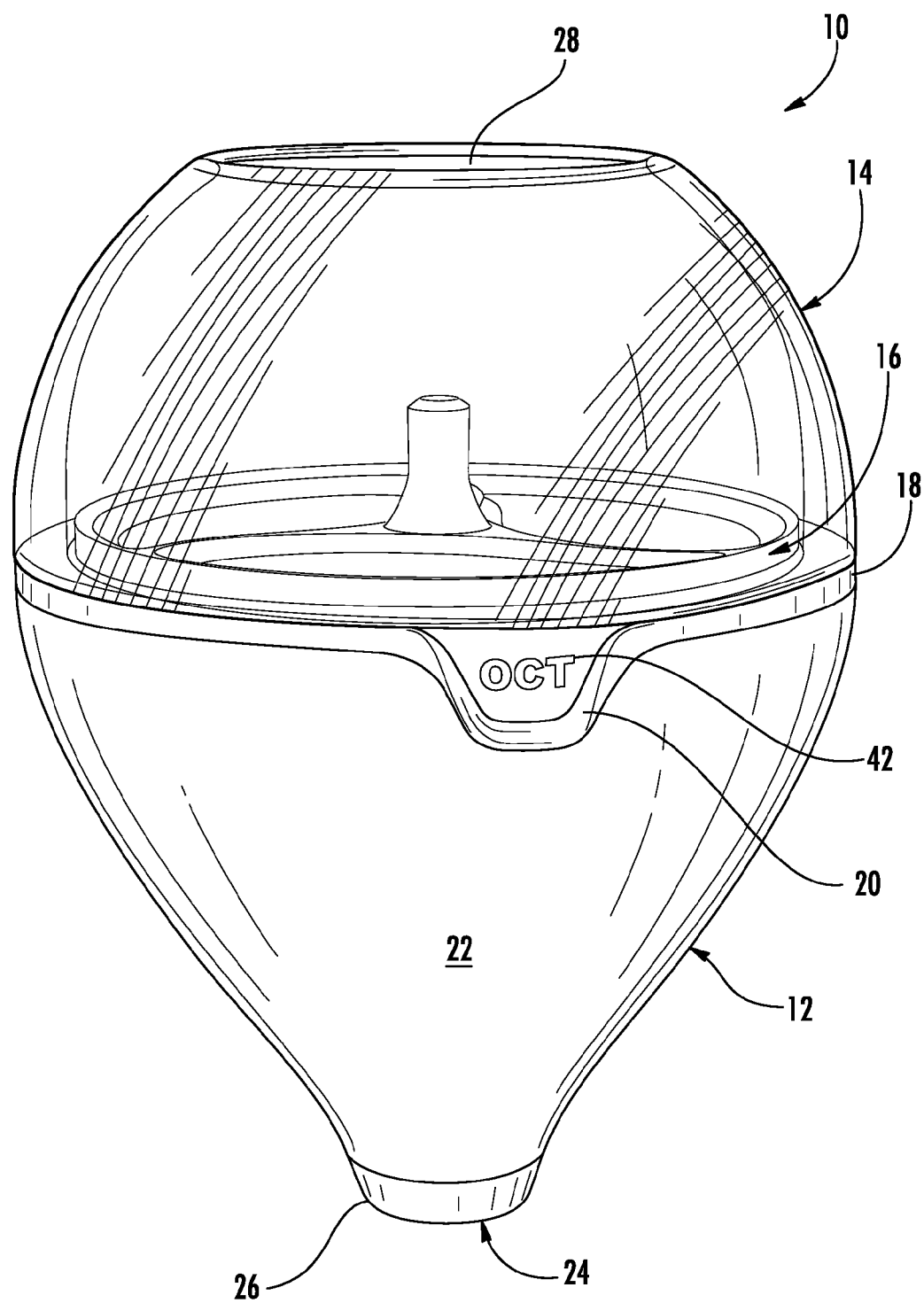
FIG. 1 is a front prospective view of a drop-shaped gravity filter assembly according to an aspect of the present disclosure.
Figure 2:
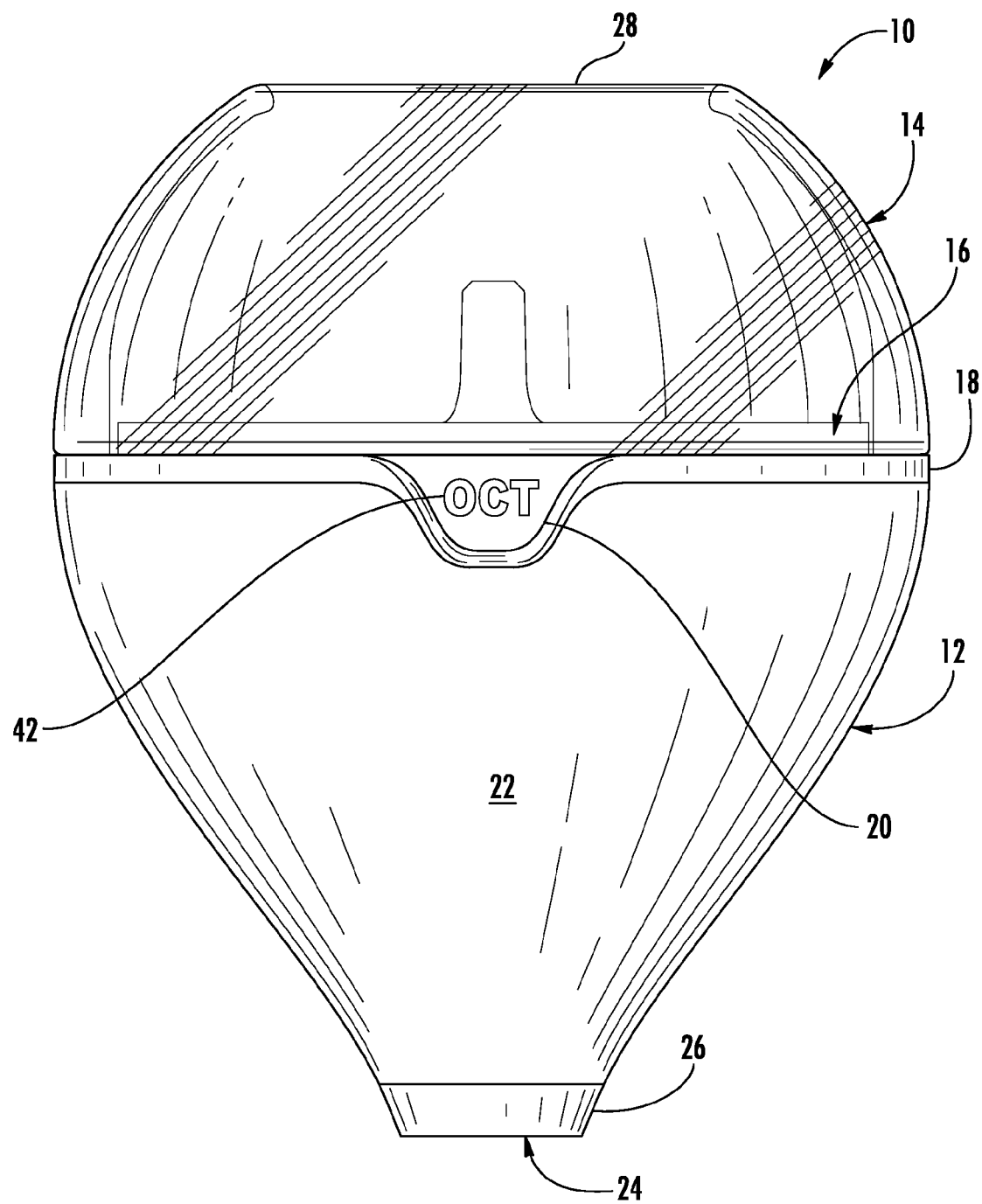
FIG. 2 is an elevated front view of a drop-shaped gravity filter assembly according to an aspect of the present disclosure.
Figure 3:
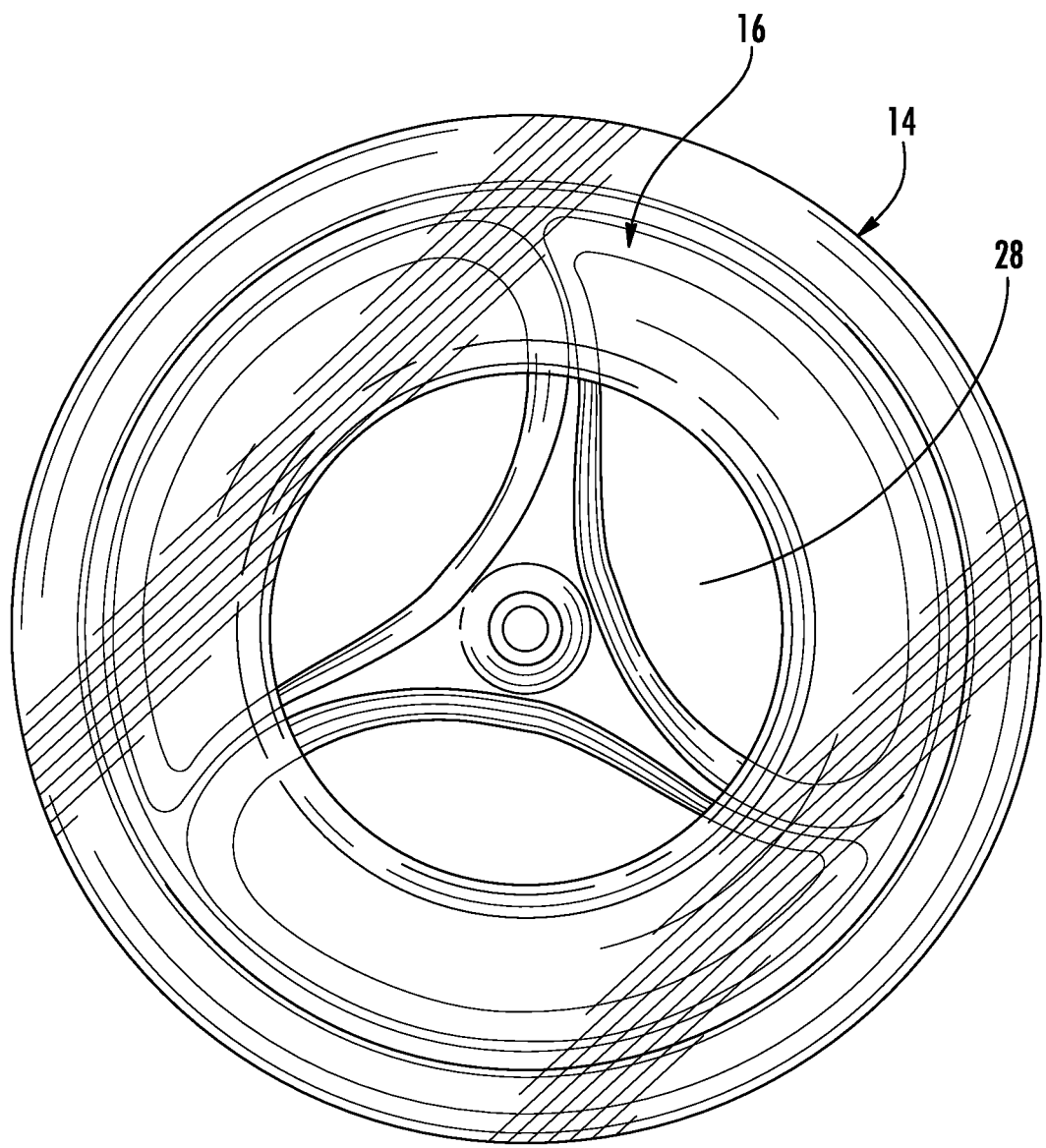
FIG. 3 is a top view of a drop-shaped gravity filter assembly according to an aspect of the present disclosure.
Figure 4:
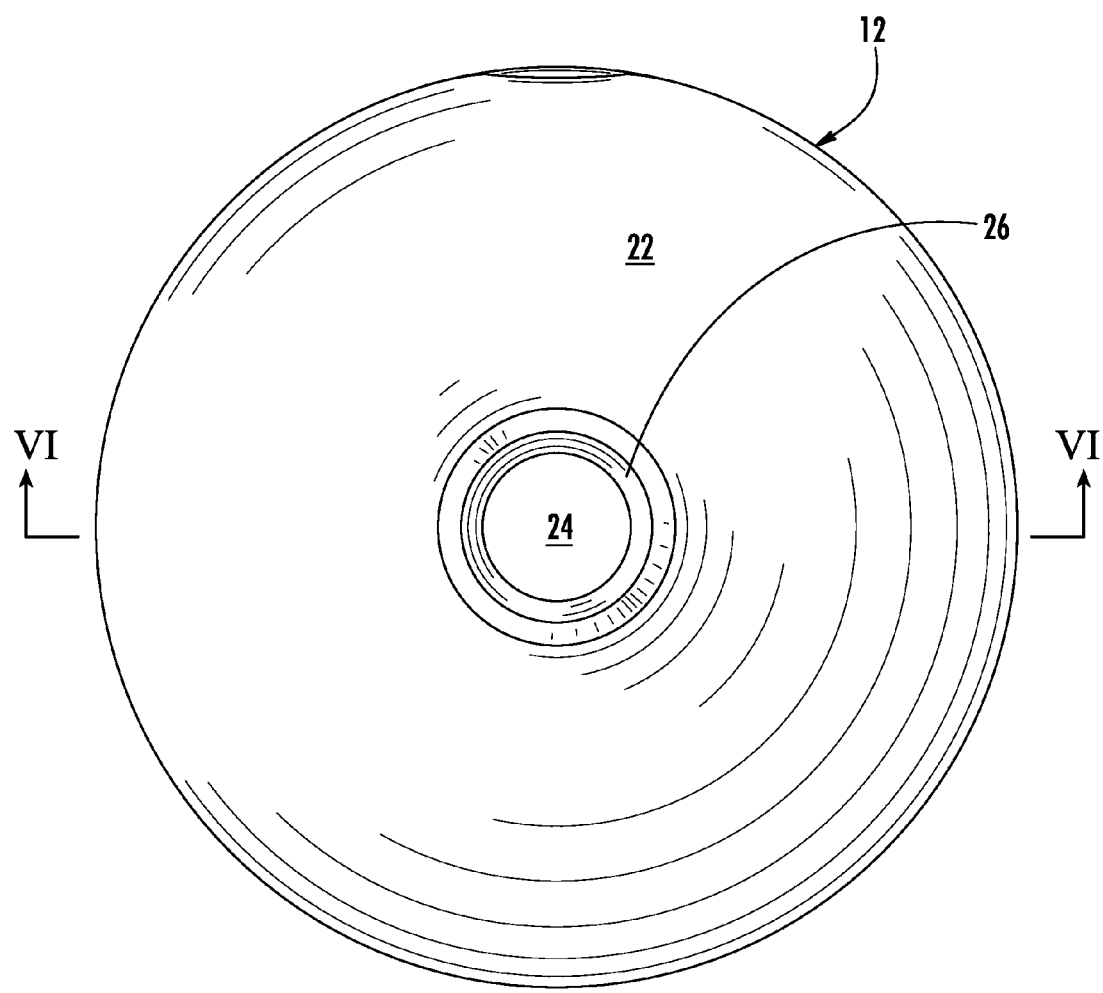
FIG. 4 is a bottom view of a drop-shaped gravity filter assembly according to an aspect of the present disclosure.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

It will be understood by one having ordinary skill in the art that construction of the described disclosure and other components is not limited to any specific material. Other exemplary embodiments of the disclosure disclosed herein may be formed from a wide variety of materials, unless described otherwise herein. In this specification and the amended claims, the singular forms "a," "an," and "the" include plural reference unless the context clearly dictates otherwise.

Where a range of values is provided, it is understood that each intervening value, to the tenth of the unit of the lower limit unless the context clearly dictates otherwise, between the upper and lower limit of that range, and any other stated or intervening value in that stated range, is encompassed within the disclosure. The upper and lower limits of these smaller ranges may independently be included in the smaller ranges, and are also encompassed within the disclosure, subject to any specifically excluded limit in the stated range. Where the stated range includes one or both of the limits, ranges excluding either or both of those included limits are also included in the disclosure.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

FIGS. 1-4 show an assembled gravity filter assembly of an aspect of the present disclosure. The gravity filter assembly is generally drop-shaped design, but conceivably could be any shape such as a cylinder-shaped design. The gravity filter assembly 10 may treat any fluid, but typically would be used to filter and/or treat water. The drop shaped gravity filter assembly 10 typically has at least a bottom funnel portion 12, a top cap portion 14, and a filter 16. The bottom funnel portion typically has a perimeter 18 that operably engages the filter 16 and the top cap portion when the components are assembled for use. The bottom funnel portion typically, but optionally, has a cutout portion 20 that allows for a portion of the exterior of the filter to show through and be visible to a user of the drop-shaped gravity filter. The outside surface 22 of the bottom funnel portion 12 typically has a curvilinear perimeter path that terminates at a liquid outlet 24, typically a water outlet, at the base 26 of the bottom funnel portion 12. The bottom funnel portion is conically shaped and tapers smoothly following the curvilinear path from the perimeter, which is typically circular, to the base 26. The bottom funnel portion 12, the top cap portion 14, and the filter 16 are typically constructed of a polymeric (plastic) material, but could also be constructed of glass or other material as well. The material may be opaque, translucent, or transparent. Typically, the bottom funnel portion 12 is opaque and the top cap portion 14 is transparent or translucent. The top cap portion typically has a liquid receiving aperture 28, which is typically circular, at the upper surface of the top cap section. The aperture 28 is typically sized to at least receive a given amount of water flow, which may be a water flow from a faucet.

Figure 5:
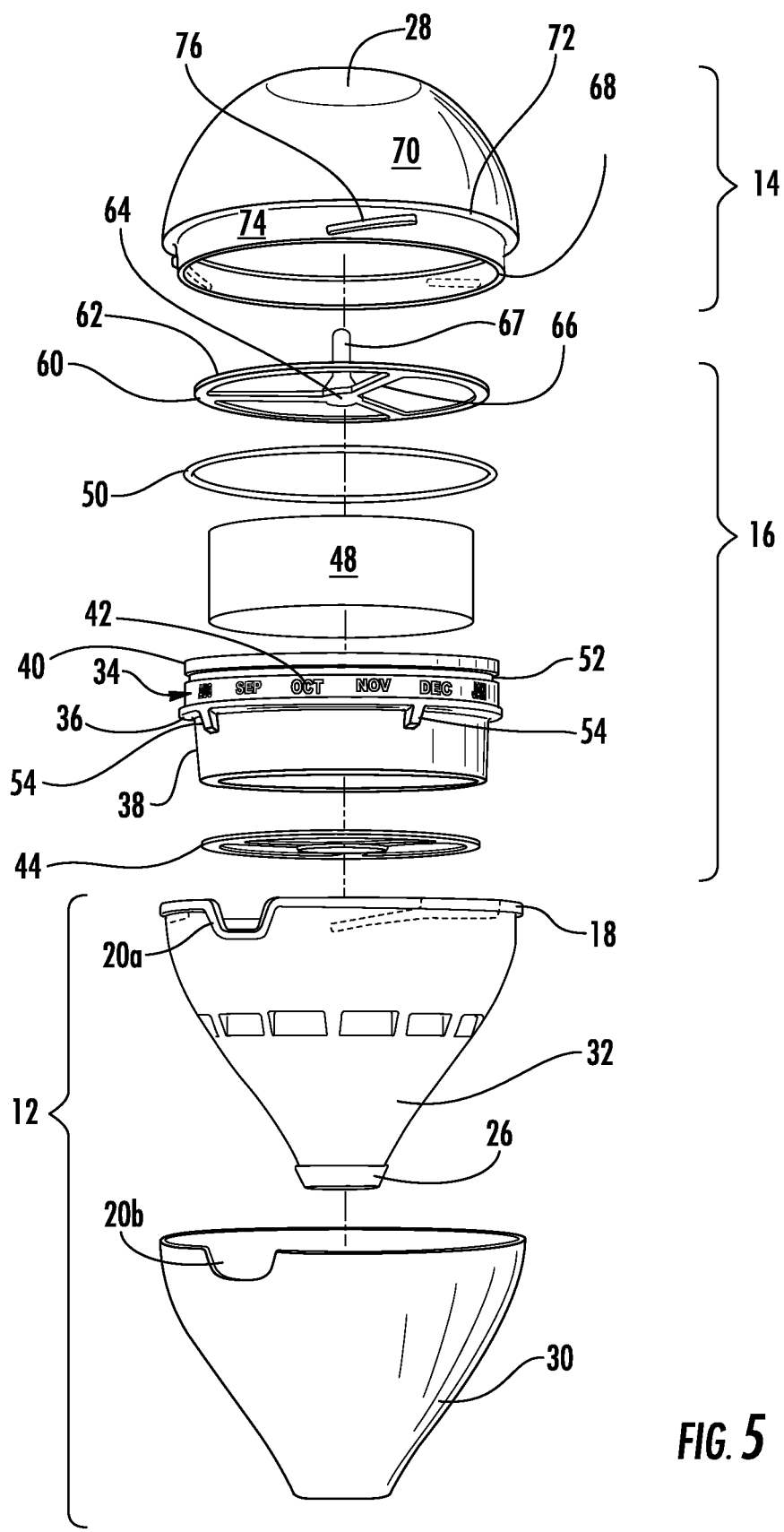
FIG. 5 is an exploded view of a drop-shaped gravity filter assembly according to an aspect of the present disclosure.
Figure 5A:
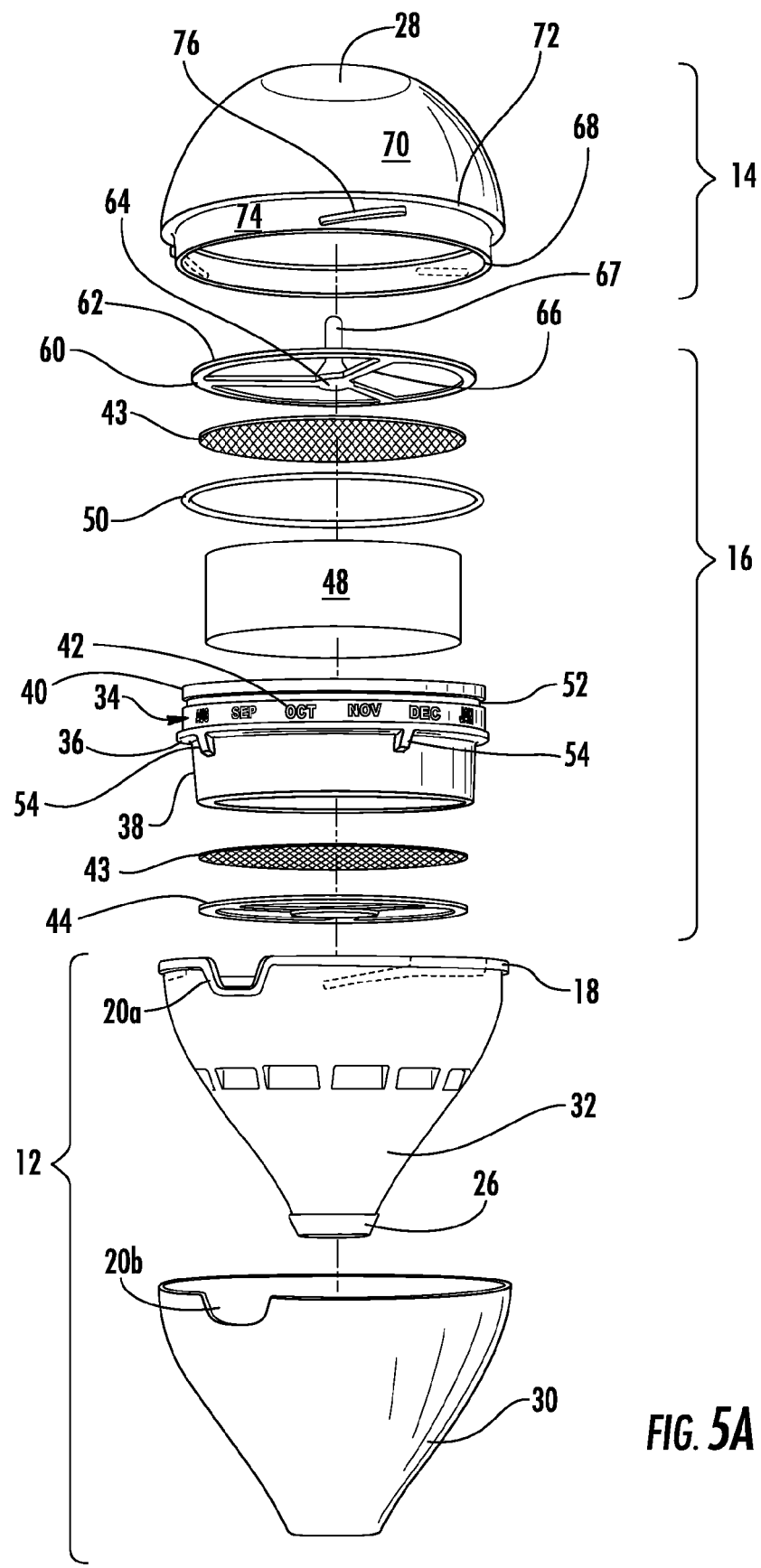
FIG. 5A is an exploded view of a drop-shaped gravity filter assembly according to another aspect of the present disclosure.
Figure 6:
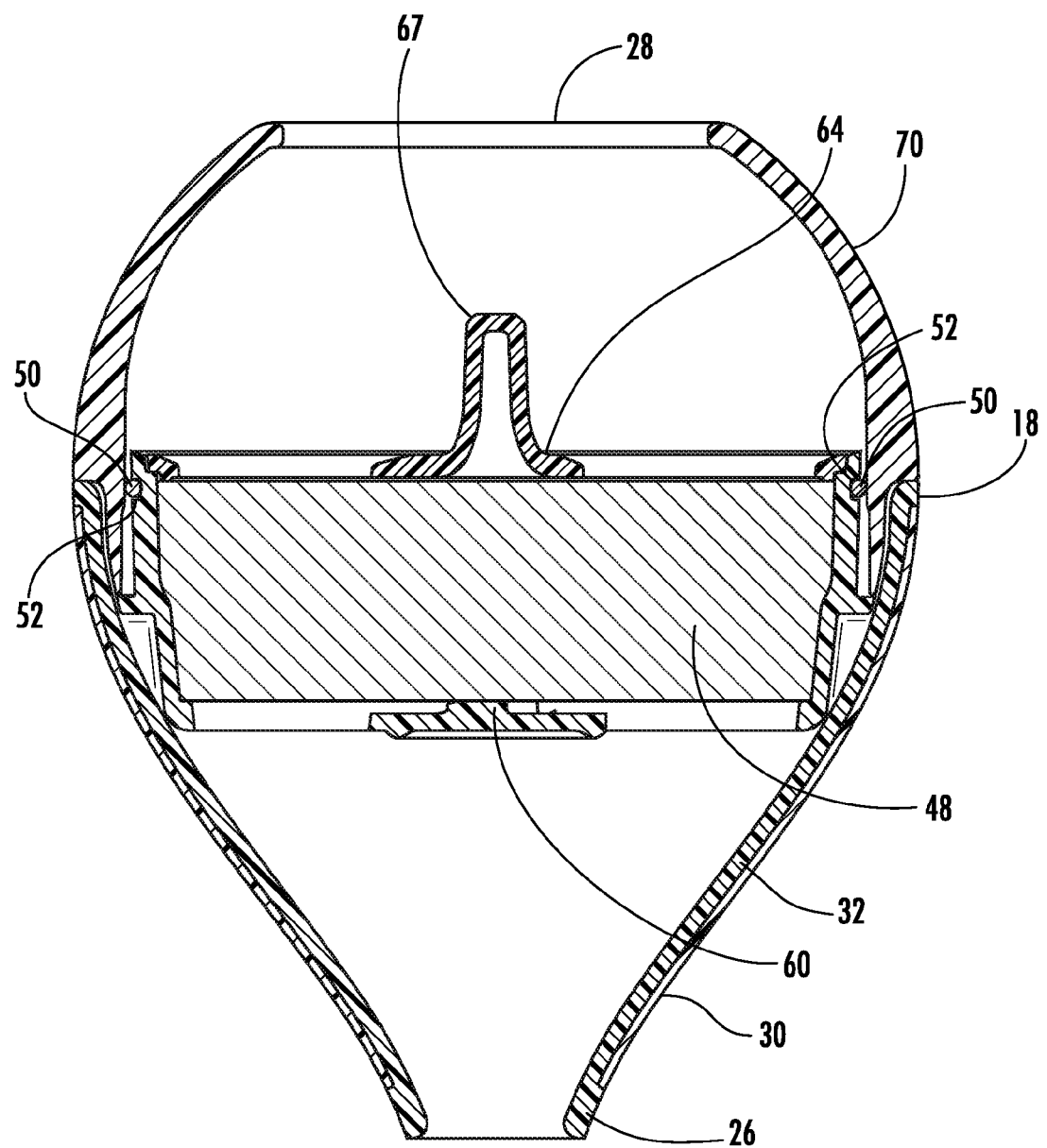
FIG. 6 is a cross-sectional view of a drop-shaped gravity filter assembly according to an aspect of the present disclosure taken along the plain of VI-VI in FIG. 4.

FIGS. 5 and 5A show exploded views of embodiments of the gravity filter assembly 10 according to the present disclosure. The drop-shaped gravity filter assembly bottom portion 12 typically has an over-molded material 30, which is typically a plastic or an elastomeric material that facilitates gripping of the filter by the user and/or the vessel it may be engaged with during a filtering operation. The over-molded material 30 also typically has a cutout portion 20b that matches the cutout portion 20a of the host component 32 of the overall bottom funnel portion 12 when a cutout portion 20 is present as part of the bottom funnel portion 12.

An aspect of the filter 16 is also shown exploded in FIG. 5 and another in FIG. 5A. The filter typically has a side wall section 34. The side wall section 34 has an outwardly projecting lip 36 typically positioned about two-thirds of the way to the top of the side wall section. The outwardly projecting lip 36 is typically positioned proximate the bottom of the side wall section, but may be up to about ½ to about ⅔ up the side wall section such that it divides the side wall section into a bottom portion 38 and an upper portion 40. The upper portion may have at least one, but typically has a plurality of indicators 42. The indicators are typically visible within the cutout portion 20. They typically function to indicate to the user when the filter should be replaced. When the filter has a six month useful life, for example, and the user inserts the filter in April, the user should, in the embodiment shown, place the filter within the bottom funnel portion, such that it mates with the bottom portion and displays "OCT" through the cutout portion as shown. In addition, a version is conceived where the indication shows both the install and end of life month abbreviation through the cutout portion 20. Also, as shown in FIGS. 15A, 16A, 19A, and 20A and described in more detail later, the filter 16 may be shorter and have the section of the side wall with the indicators 42 removed. As shown in FIG. 5A, a mesh material, which typically is a stainless steel mesh screen or a plastic (polyethylene or polypropylene) mesh screen 43 may be integrated or engaged with the filter base 44 and the filter top 60 as well.

Figure 7:
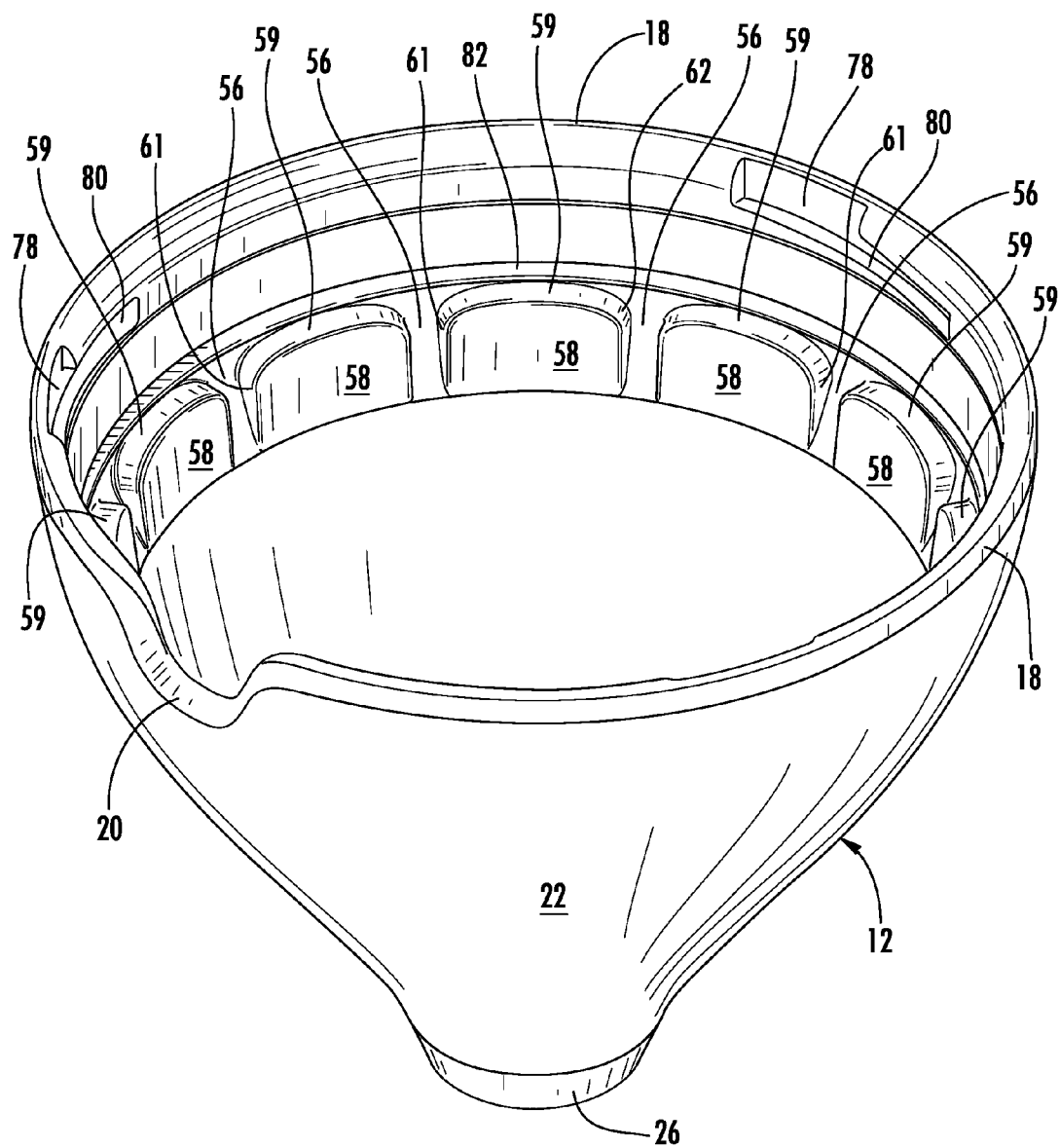
FIG. 7 is a front perspective view of the bottom funnel portion of a drop-shaped gravity filter assembly according to an aspect of the present disclosure.
Figure 8:
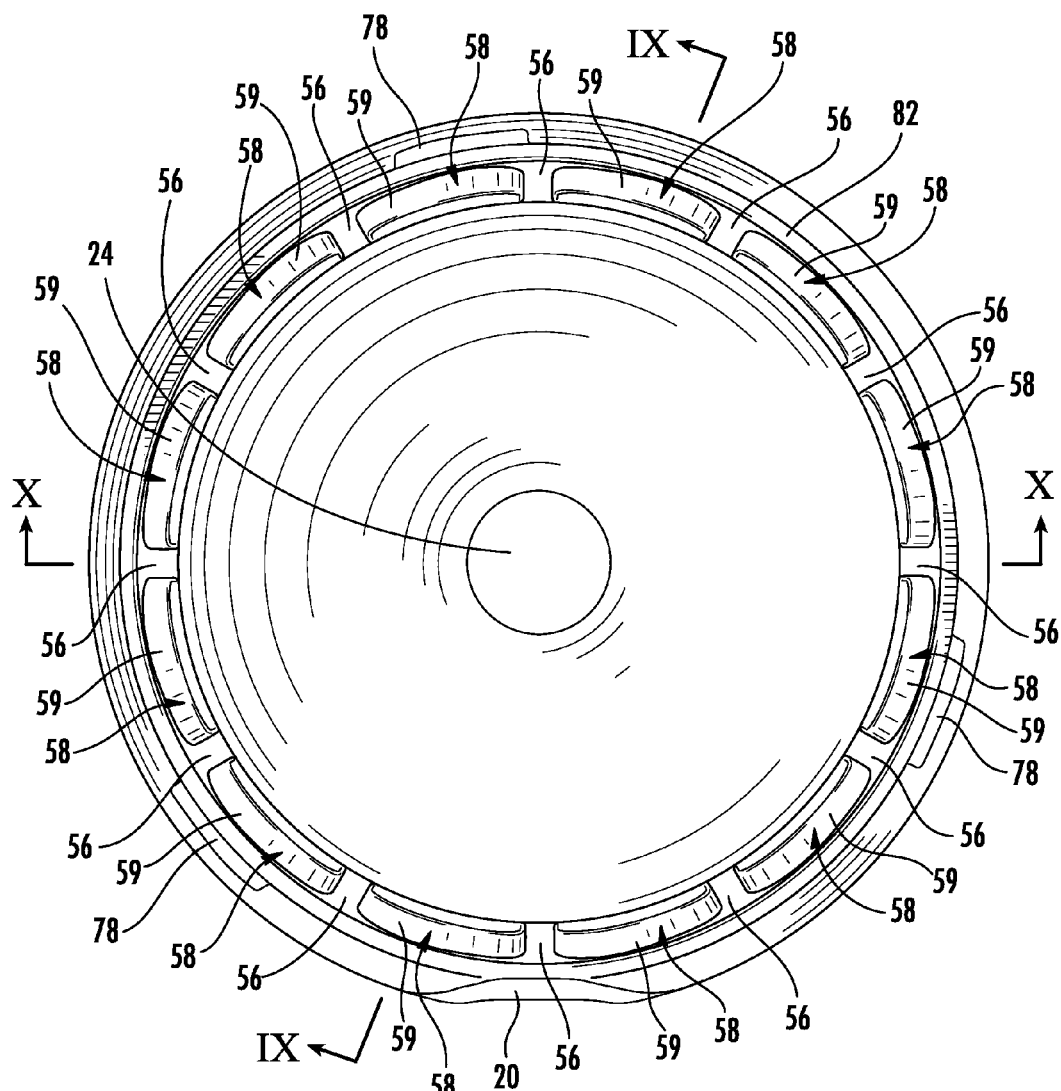
FIG. 8 is a top view of the bottom funnel portion according to an aspect of the present disclosure.
Figure 9:
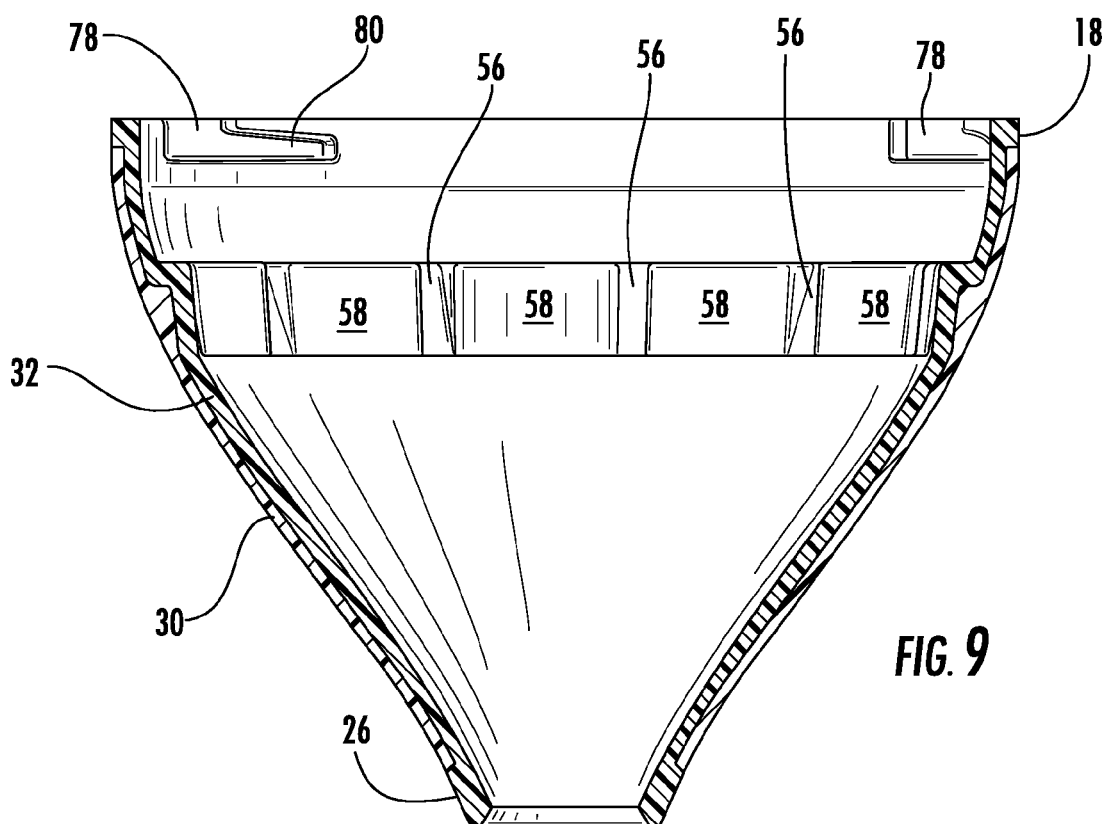
FIG. 9 is a cross-sectional view of the bottom funnel portion taken along lines IX-IX in FIG. 8.
Figure 10:
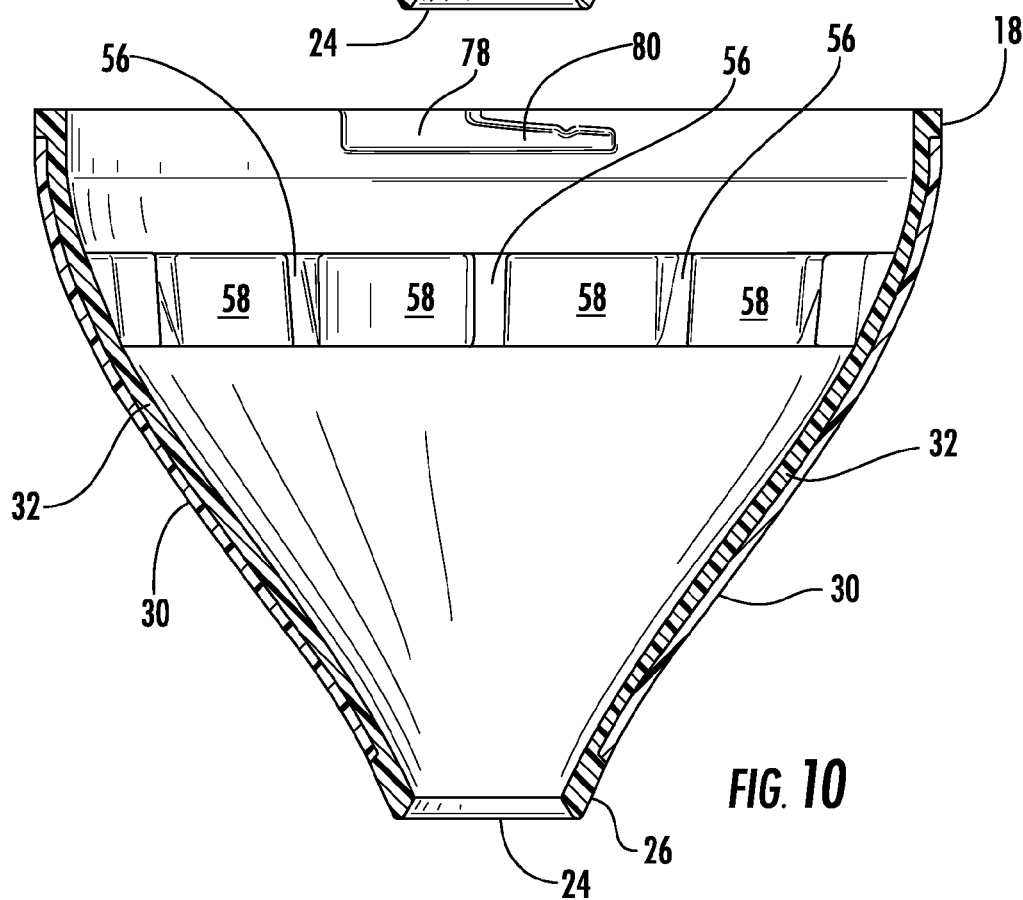
FIG. 10 is a cross-sectional view of the bottom funnel portion taken along lines X-X in FIG. 8.
Figure 15:
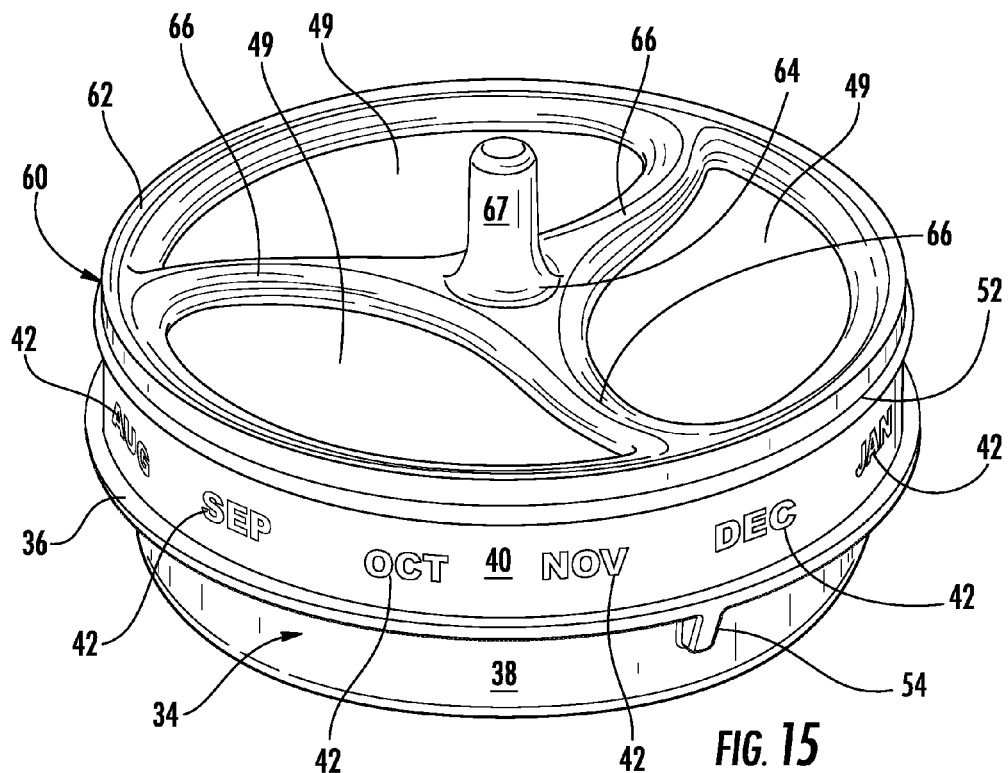
FIG. 15 is a front perspective view of the filter of the drop-shaped gravity filter assembly according to an aspect of the present disclosure.
Figure 16:
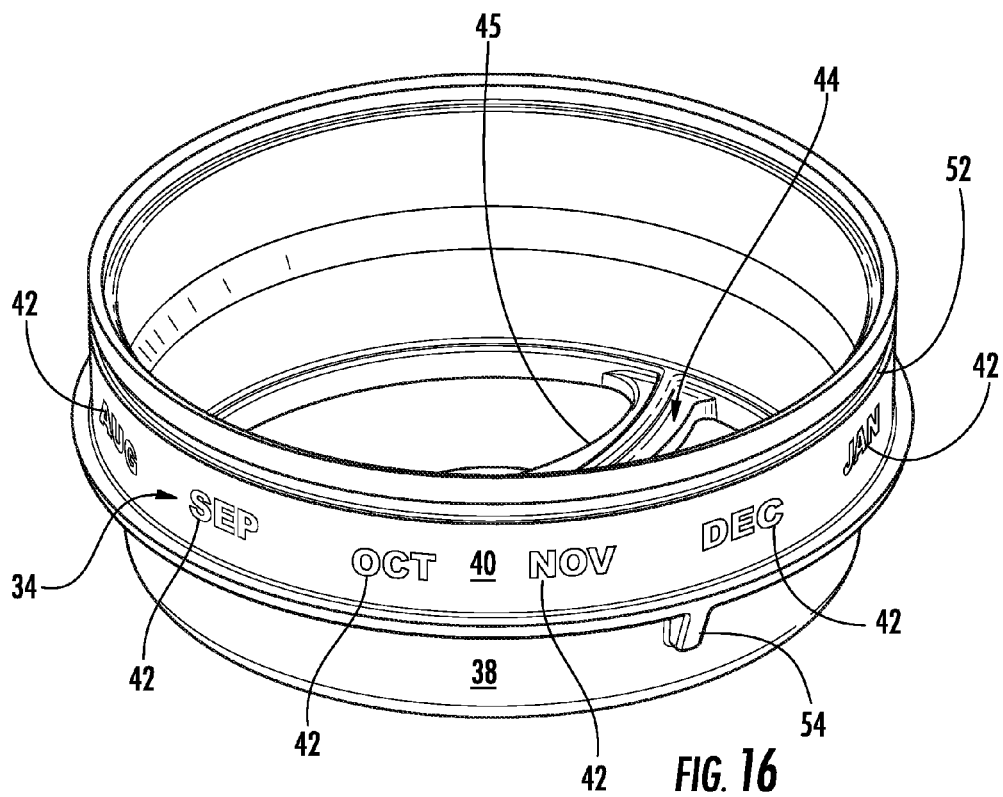
FIG. 16 is a front perspective view of the filter according to an aspect of the present disclosure with the top filter media retention element removed showing the interior of the filter.
Figure 15A:
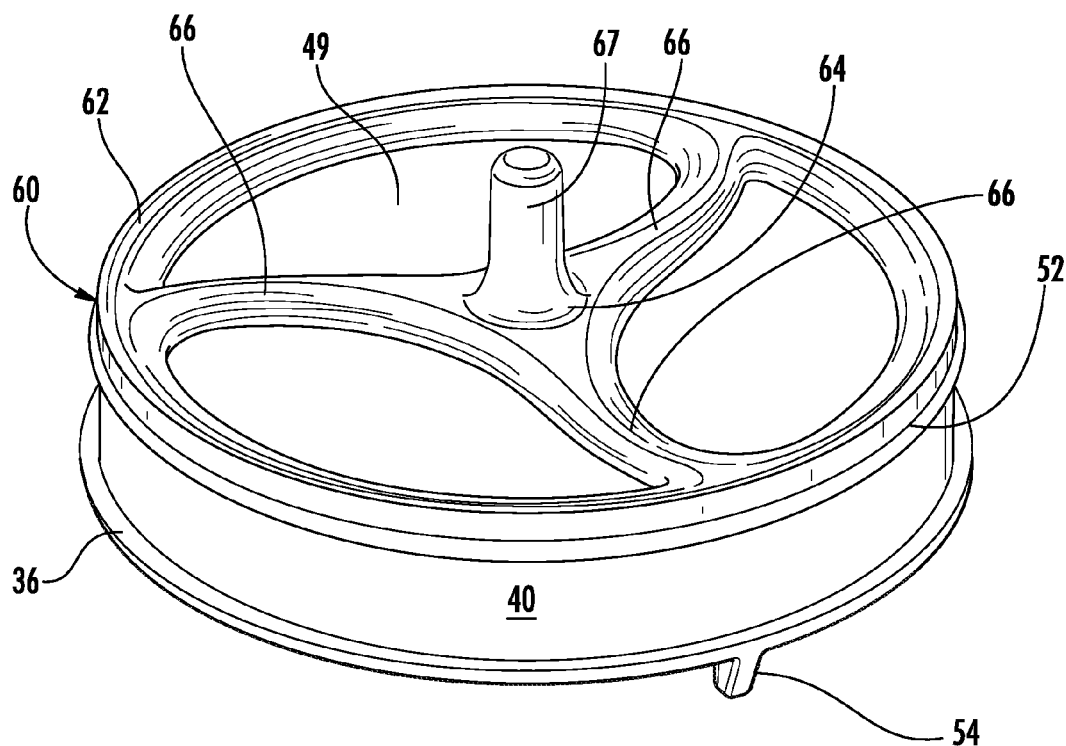
FIG. 15A is a front perspective view of the filter of the drop-shaped gravity filter assembly according to another aspect of the present disclosure.
Figure 16A:
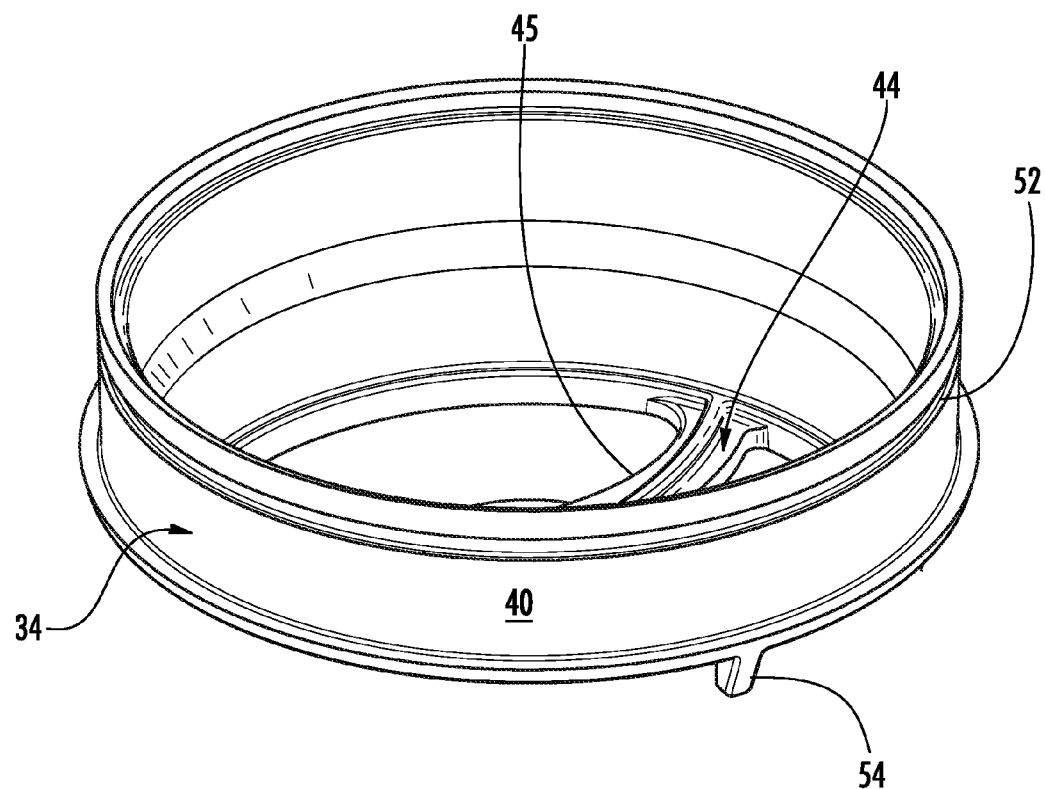
FIG. 16A is a front perspective view of the filter according to another aspect of the present disclosure with the top filter media retention element removed showing the interior of the filter.
Figure 17:
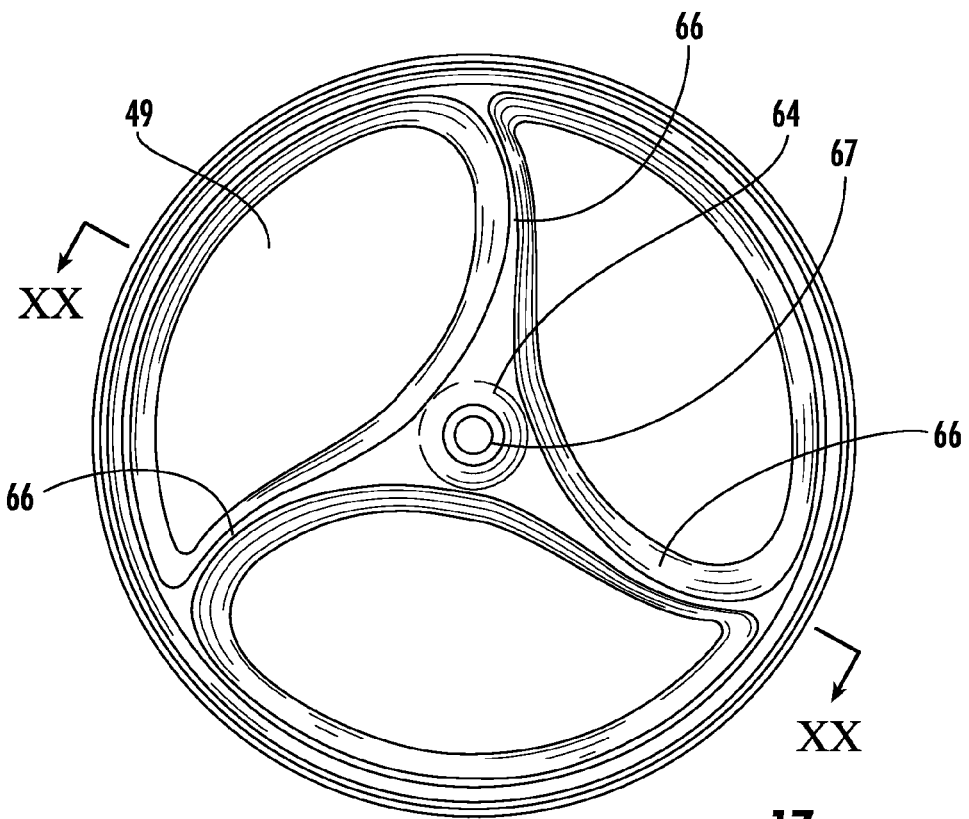
FIG. 17 is a top view of the filter according to an aspect of the present disclosure.
Figure 18:
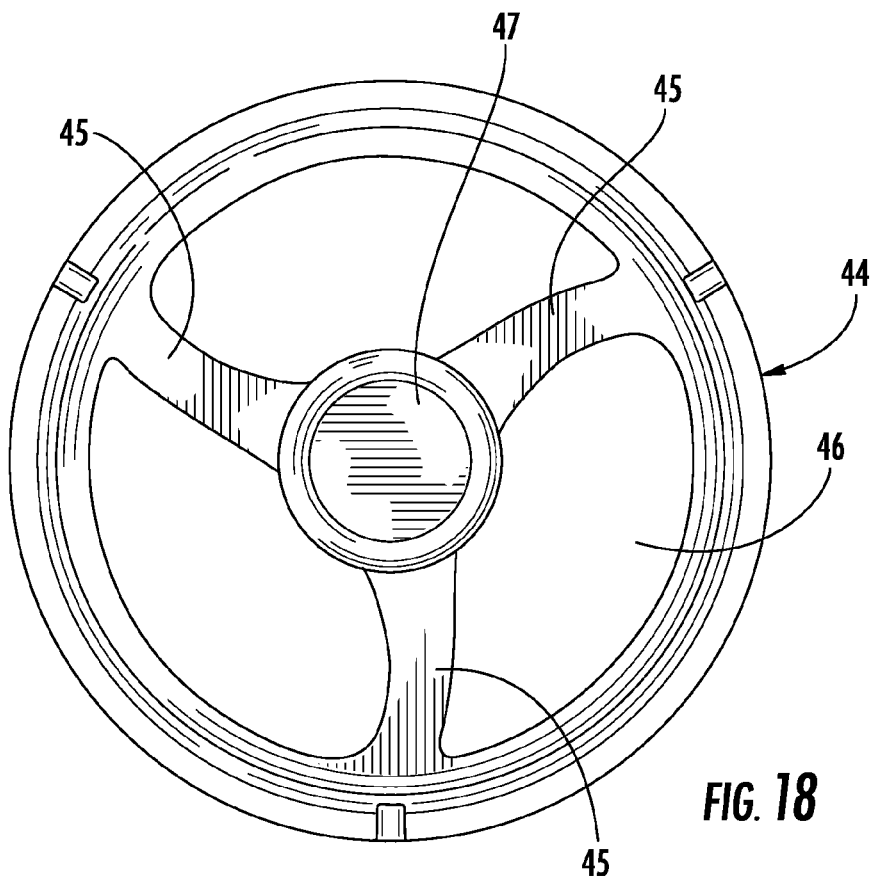
FIG. 18 is a bottom view of the filter according to an aspect of the present disclosure.
Figure 19:
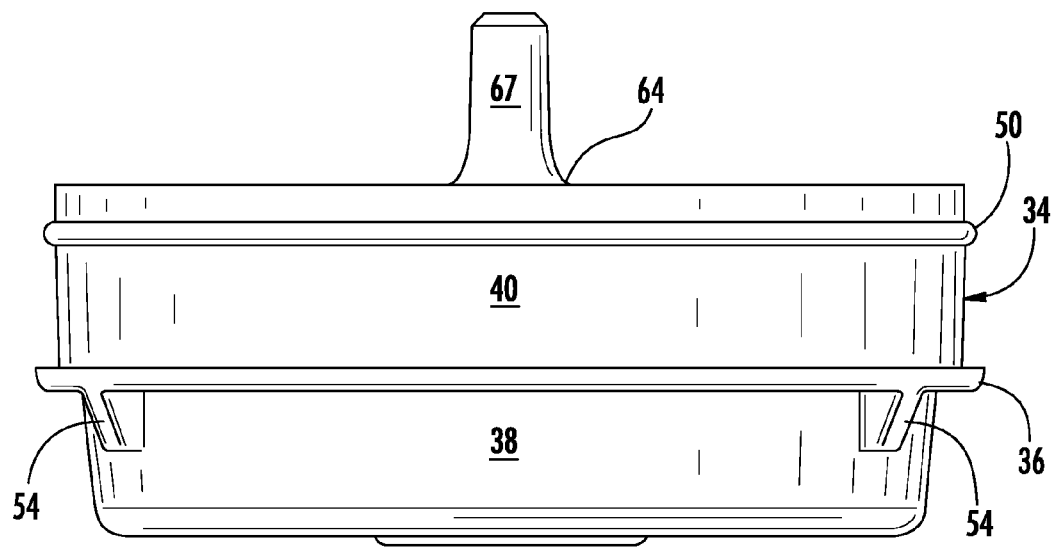
FIG. 19 is a side view of the filter according to an aspect of the present disclosure.
Figure 20:
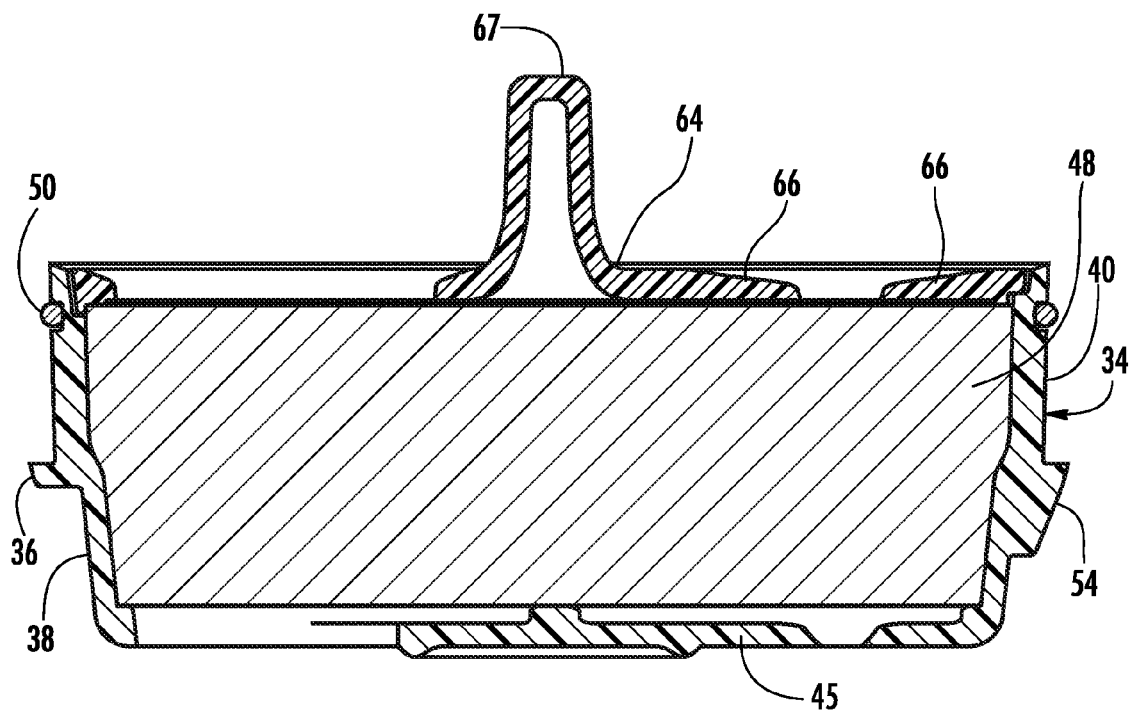
FIG. 20 is a cross-sectional view of the filter shown in FIG. 19 according to an aspect of the present disclosure taken along lines XX-XX in FIG. 17.
Figure 19A:
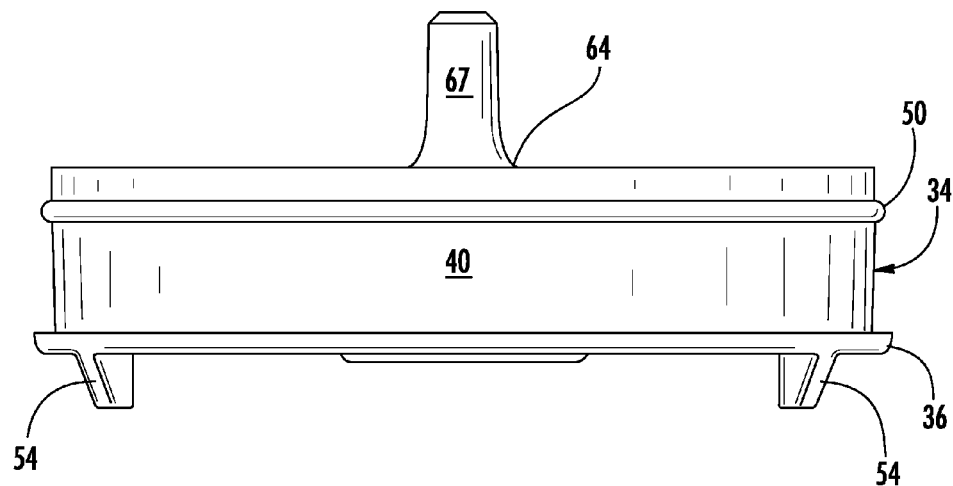
FIG. 19A is a reduced height version of the filter of FIG. 19.
Figure 20A:
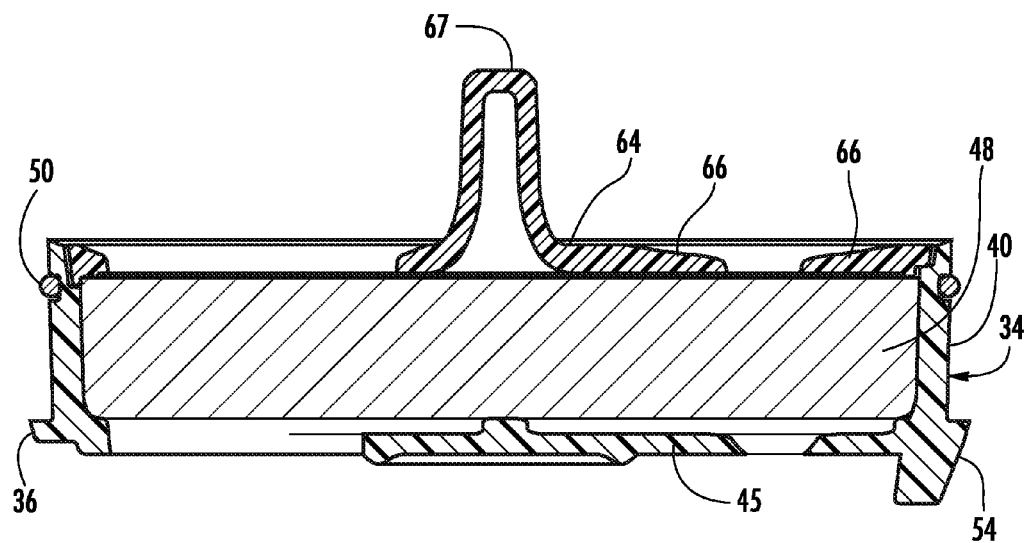
FIG. 20A is a cross-sectional view of the filter of FIG. 19A.
Figure 37:
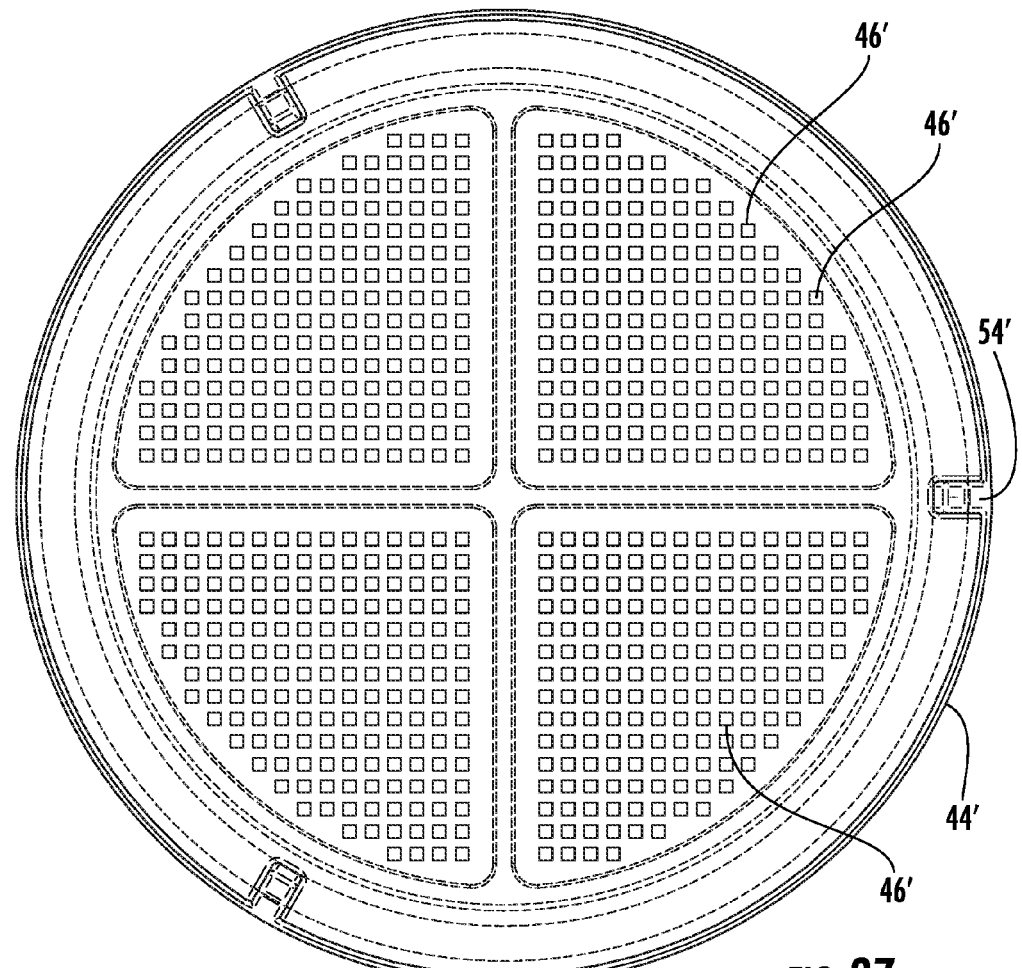
FIG. 37 is a bottom view of the filter shown in FIG. 33.

The filter further typically includes a filter base 44, which may be spoked (reference numeral 45) about a hub 47, FIG. 18, or have a sufficient number and/or sized apertures 46 (or 46' in FIGS. 37-38) to allow water flow at a rate faster than the water flow through the filter material 48, which may be a permeable or porous, loose or a more compressed filter media. The filter base 44 can be a separate component that is engaged with the side wall section 34 or the filter base may be integrated with the side wall section as a single component. An O-ring 50 or other typically elastomeric material is spaced within a channel 52 in the upper portion 40 or atop the upper portion 40 of the filter side wall 34. The bottom portion 38 of the filter side wall 34 also typically includes at least one, but more typically a plurality, and most typically about three downwardly projecting tabular members 54. These tabular members are matingly received within spaces 56 between the interior projecting members 58, which are typically wedge-shaped members or are human incisor teeth-shaped and project into the interior of the bottom funnel portion 12 per FIG. 7. The interior projection members have an upper shelf 59 that extends into the interior of the bottom funnel portion as well as tapered sides 61 extending down toward the liquid outlet 24 (see FIGS. 7 and 8). This somewhat lock-and-key-type engagement, where the tabular members 54 are seated at least partially, more typically fully, within the spaces 56, between the filter 16 and the funnel portion 12 facilitates the secure, but easy engagement and disengagement of the filter by hand and without the use of tools with the bottom portion 12 without being threadably engaged with one another. The engagement also facilitates the engagement of the filter with the bottom filter portion in such a manner that the appropriate indicator, when employed, shows through the cutout portion and that only purposeful adjustment of the filter within the funnel will change the indicator when viewed through the cutout portion 20. As mentioned above, different height versions of the filter 16 are possible. In particular, a tall version as described above with indicators 42 arranged on side wall surface 34 as shown in FIGS. 15 and 16 and a shortened version without side wall section 38 and indicators 42 arranged on side wall surface 34 as shown in FIGS. 15A, 16A, 19A, and 20A.

The filter also typically has a filter top 60 that seals the filter material 48 within the overall filter 16. The filter top 60 typically a circular perimeter and typically has a perforated structural section 62 that is typically sized and shaped to fit within the side wall section 34 and rim 68 of the top cap portion 14. The perforated structural section is joined (shown, using spokes 66) with a hub 64, which typically is centrally located and has an upwardly projecting spindle 67 to facilitate it being grasped by a user. The perforated structural section allows for fluid, typically water, to flow through apertures 49 in the filter top and into engagement with the filter material 48 to allow the water or other fluid to be treated by the filter material.

Figure 11:
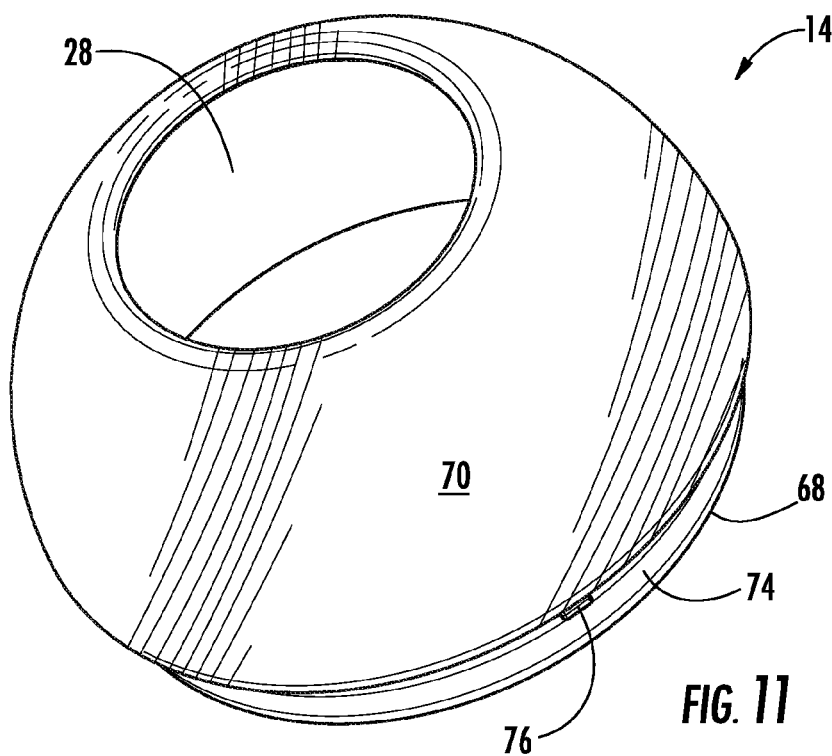
FIG. 11 is a perspective view of the top cap portion of a drop-shaped gravity filter assembly according to an aspect of the present disclosure.
Figure 12:
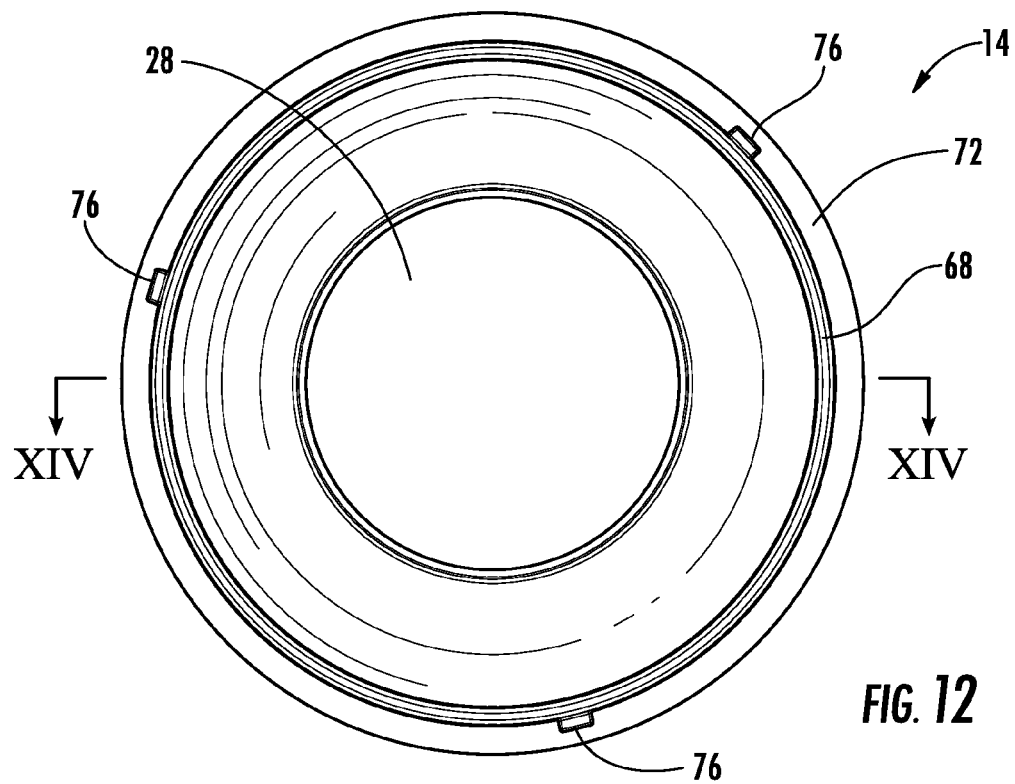
FIG. 12 is a bottom view of the top cap portion of a drop-shaped gravity filter assembly according to an aspect of the present disclosure.

The perimeter rim section 63 of the top cap portion 14 is typically indented a specific distanced from the outer curved wall portion 70 such that the outer curved wall portion mates with the bottom funnel portion 12 outside surface 22 and creates an at least substantially contiguous surface such that the exterior of the gravity filter assembly appears to be a smooth surface when assembled. The indented distanced creates a lip 72. As shown in FIGS. 5, 5A, 7 and 9-10, the perimeter rim section 63 outer surface 74 typically includes at least one, more typically a plurality of, and most typically about three slanted elongated members 76 that extend away from the outer surface 74 and are received in gaps 78 in the interior surface of the bottom funnel portion such that when the top cap portion is engaged with the bottom funnel portion and rotated, the elongated members 76 slide into engagement with the grooves 80 to retain the two in engagement with one another, but still allowing the two pieces to be disengaged and reengaged with one another by hand and without the use of tools. Alternative versions of the engagement members are shown in FIGS. 11-13, which show the members 76 that are smaller, more rectangular prism shaped members that may or may not be slanted. They are shown not slanted.

The interior of the bottom portion 12 also typically has an interior shelf 82 (see FIG. 7) that receives the lip 36 of the side wall of the filter 16 and engages the bottom surface of that lip 36. The top surface of the lip 36 typically engages the funnel engaging rim 68.

The at least one medium 48 is typically a filter medium, but conceivably could add components to the fluid (typically water) flowing through, or otherwise, into contact with the at least one medium 48. As discussed later in more detail, this could include chlorine or other halogens. Typically, the at least one medium is a filter medium 48. The medium is positioned within the filter 16 and may include: (1) material configured to treat water, especially water for human consumption, chosen from a treatment group consisting of filtering particulate matter from the water; (2) material that adds a descaling agent to the water, vitamins to the water, minerals to the water, and/or one or more pharmaceutically active agent(s); (3) material that removes specific soluble organic or in-organic elemental compounds and thus improves the taste of the water, removes odor from the water, and alters the color of the water; (4) reduces concentrations of heavy metals, pesticides, volatile organic compounds, specific pharmaceutically active agents; (5) removes cysts and micro-organisms; (6) adding a halogen such as bromine, iodine, chlorine compounds as a disinfectant agent to the water; (7) conditions the water such as softening through use of ion exchange resins or ALUSIL™ (an aluminosilicate) to change the chemical structure of calcium chloride in solution to reduce scaling deposition; or (8) combinations of any or all of the above materials.

The descaling agents that may be added to the fluid by the treatment medium may be chosen from the group consisting of organic acid, inorganic acid, sulfonic acid, carboxylic acid, lactic acid, acetic acid, formic acid, oxalic acid, uric acid, phosphoric acid, hydrochloric acid, sulfamic acid, and mixtures thereof. The water treatment medium contained in the filter may also be chosen from the group consisting of: carbon (e.g., activated carbon particles, such as mesoporous activated carbon, carbon powder, particles sintered with a plastic binder, carbon particles coated with a silver containing material, or a block of porous carbon); ion exchange material (e.g., resin beads, flat filtration membranes, fibrous filtration structures, etc.); zeolite particles or coatings (e.g., silver loaded); polyethylene; charged-modified, melt-blown, or microfiber glass webs; alumina; aluminosilicate material; and diatomaceous earth. The water treatment medium may also be impregnated or otherwise disposed on a porous support substrate, such as a fabric material, a paper material, a polymer screen, or other conceivable porous structures that may be contained in the filter.

The water treatment medium 48 typically allows a water flow rate of at least approximately one to two liters per minute. The medium typically also reduces chlorine, taste and odor components (CTO) per NSF 42 to minimum of 60 gallons and Atrazine, Benzene, Alachlor and Lindane per NSF 53 for minimum of 60 gallons. The filter medium 48 also typically removes lead, copper, mercury, cadmium and arsenic (pH 6.5 per NSF 53 2004 standard) for up to 60 gallons, sfd. Media from Selecto described in U.S. Pat. Nos. 6,241,893 and 6,764,601, the disclosures of which are hereby incorporated by reference in their entirety, may be used. The filter medium does not typically require any presoaking and does not typically contain any carbon fines, in particular carbon fines that might find their way to the treated water, which often occurs when current carbon based gravity filters are used.

Figure 21:
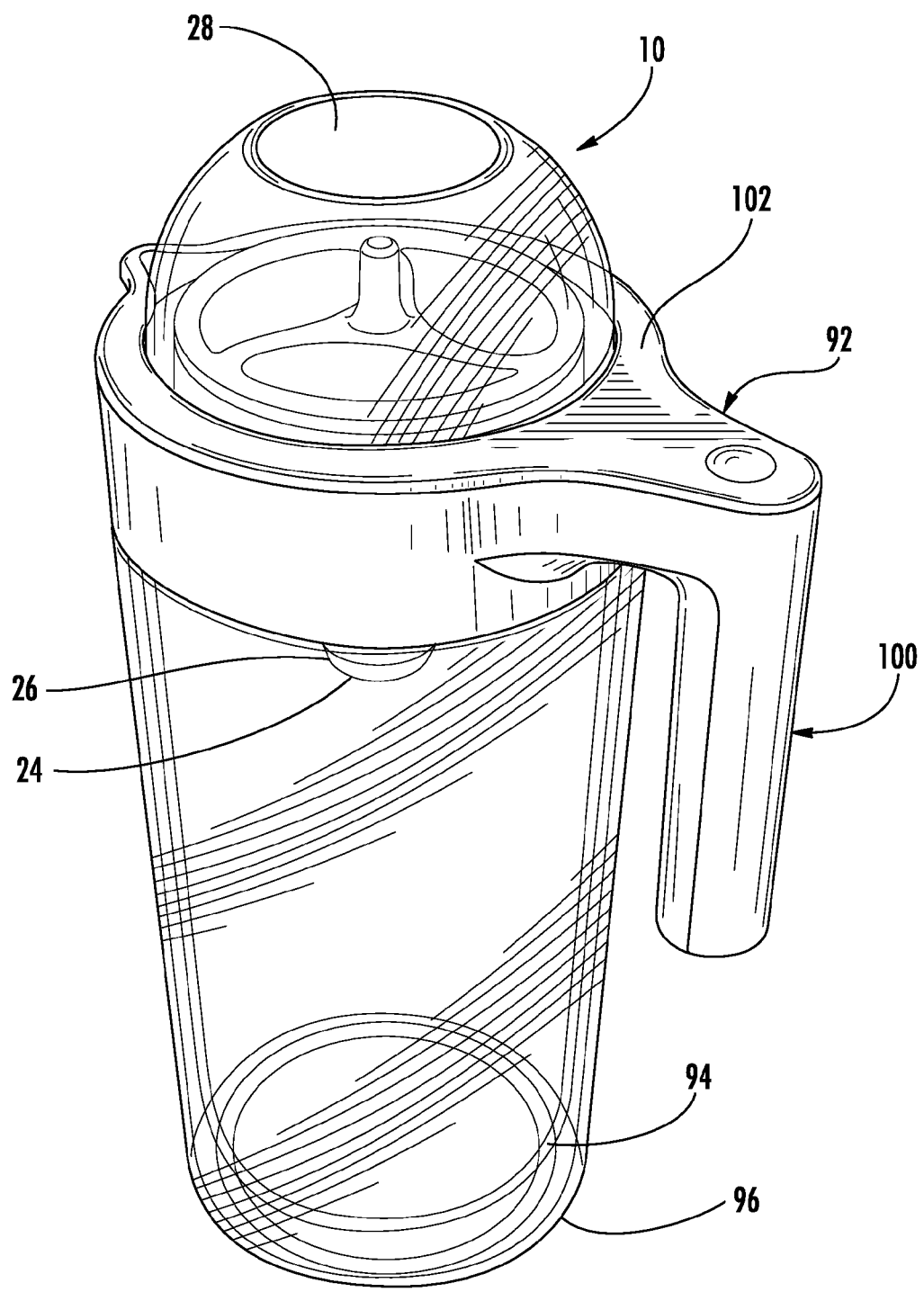
FIG. 21 is a perspective view of a drop-shaped gravity filter assembly according to an aspect of the present disclosure, positioned within the lid of a pitcher.
Figure 22:
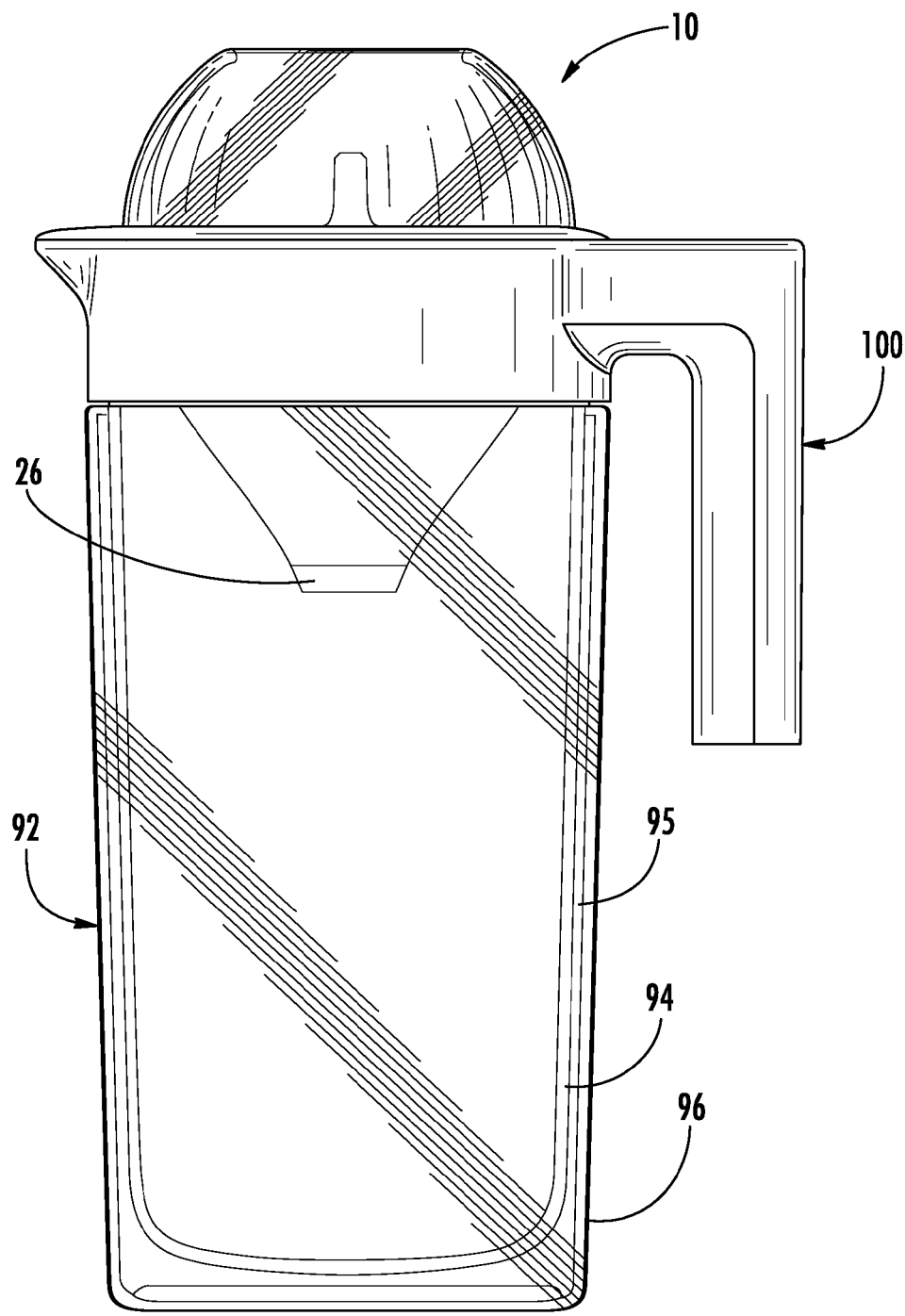
FIG. 22 is a side elevational view of a drop-shaped gravity filter assembly positioned within a pitcher.
Figure 23:
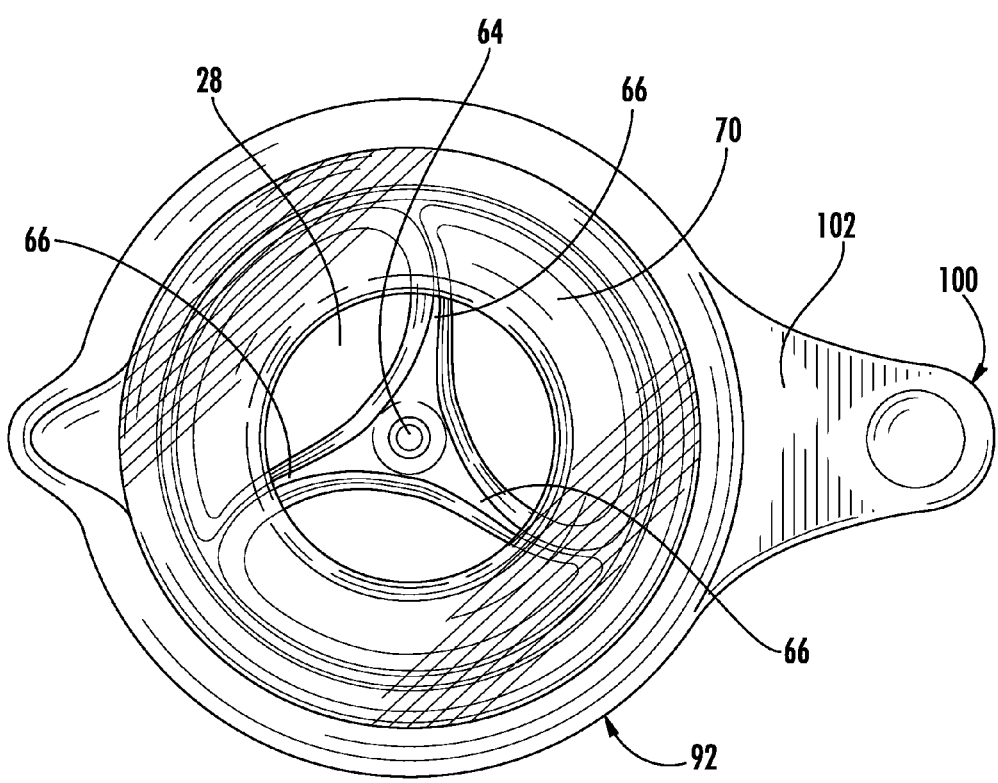
FIG. 23 is a top view of a drop-shaped gravity filter assembly positioned within a pitcher.

As shown in FIG. 21-23, the gravity filter assembly 10, which is typically a drop-shaped gravity filter, may be seated within the center section of the cap of a liquid vessel 92, which is shown as a pitcher in the Figures. The water pitcher is typically a single or double walled pitcher. The Figures show a double walled pitcher. The double walled pitcher may have an interior volume defining wall/section 94 and an exterior defining section 96. The interior volume defining wall and the exterior defining section may be constructed of the same or different materials. While plastic pitchers with both the interior volume defining wall and exterior defining section may be used, typically the interior volume defining wall 94 is a composite or single material that is a more preferred material to contact filtered water such as glass, stainless steel, gold or silver coating. When a single walled pitcher is used, the interior filtered water facing surface may be plated with the materials mentioned above. The double walled pitcher may also be constructed of glass and constructed using a glass process that is either spun welding of two pieces together blow formed or other controlled process that forms such a double walled pitcher of glass. For a single or double walled construction the glass can be blow-molded or vapor deposited onto another media such as plastic or metal. Either or both the interior volume defining wall 94 and the exterior defining section 96 may be entirely glass or may be plastic with a layer of glass on the water-contacting surface in the case of the interior volume defining wall 94 or the exterior, user facing surface of the exterior defining section 96. Such a construction lightens the weight of the overall pitcher while using a more preferred material for both tactile or visual aesthetic and water contacting. When a plastic surface is allowed to contact the filtered water, the user may perceive taste variations.

Figure 24:
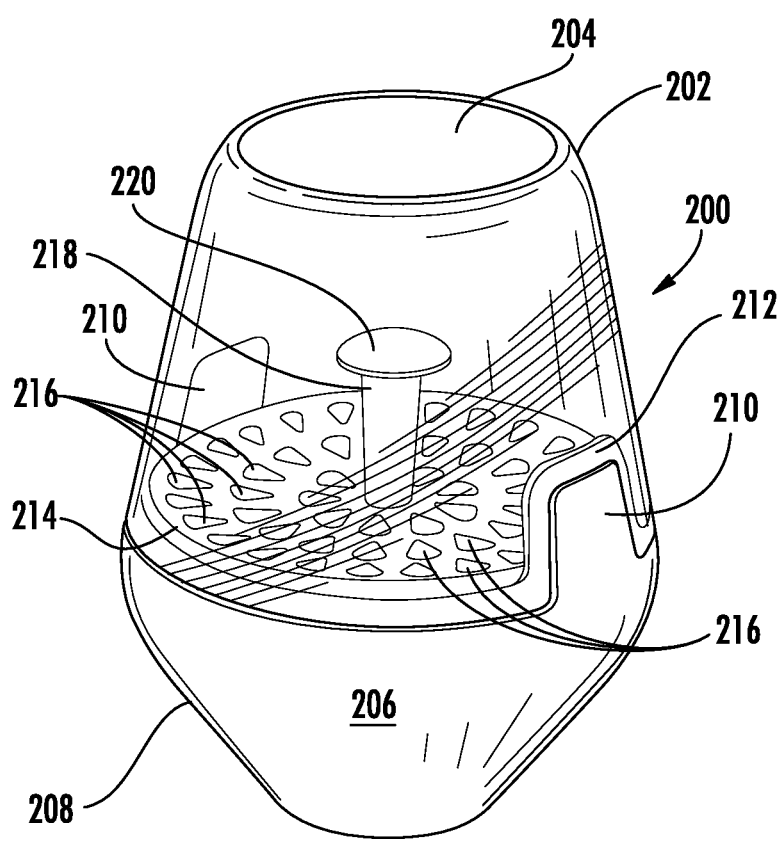
FIG. 24 is a perspective view of a gravity filter assembly according to another aspect of the present disclosure.
Figure 25:
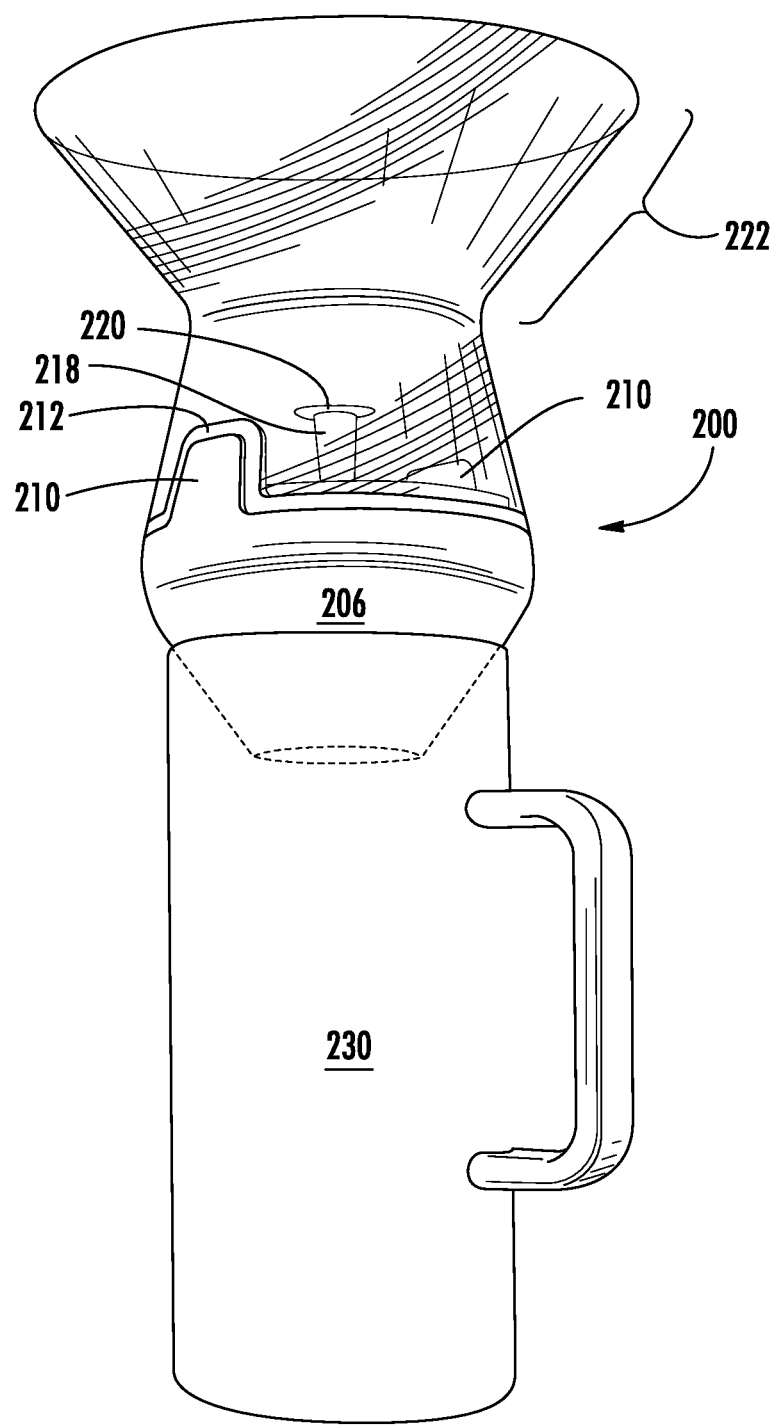
FIG. 25 is a perspective view of a shaped gravity filter assembly positioned on a liquid retaining vessel and having a conical top.

FIGS. 24-25 show additional aspects of the present disclosure. The filter shown in FIG. 24 is a filter 200 with a more cup-shaped top portion 202 with a water inlet aperture 204. The bottom portion 206 is substantially conical shaped with angled side section 208. The upper tabs 210 engage mating cutouts 212 of the top portion 202. The filter 214 has apertures 216 and an upwardly extending post 218 with a head 220 for the user to grasp to engage and disengage the filter according to this embodiment of the present disclosure.

FIG. 25 shows another aspect of the present disclosure similar to the filter shown in FIG. 24, but showing and interchangeable top portion due the common tab feature 710 with an upwardly opening funnel portion 222 that feeds the water inlet aperture. FIG. 25 also demonstrates how the filter with the universal filter within it may function to fill vessels (a pitcher 230 in FIG. 25) of any size with treated and/or filtered water or other fluids. FIG. 25 shows the filter 200 frictionally engaged along the bottom conical surface of the filter.

Figure 26:
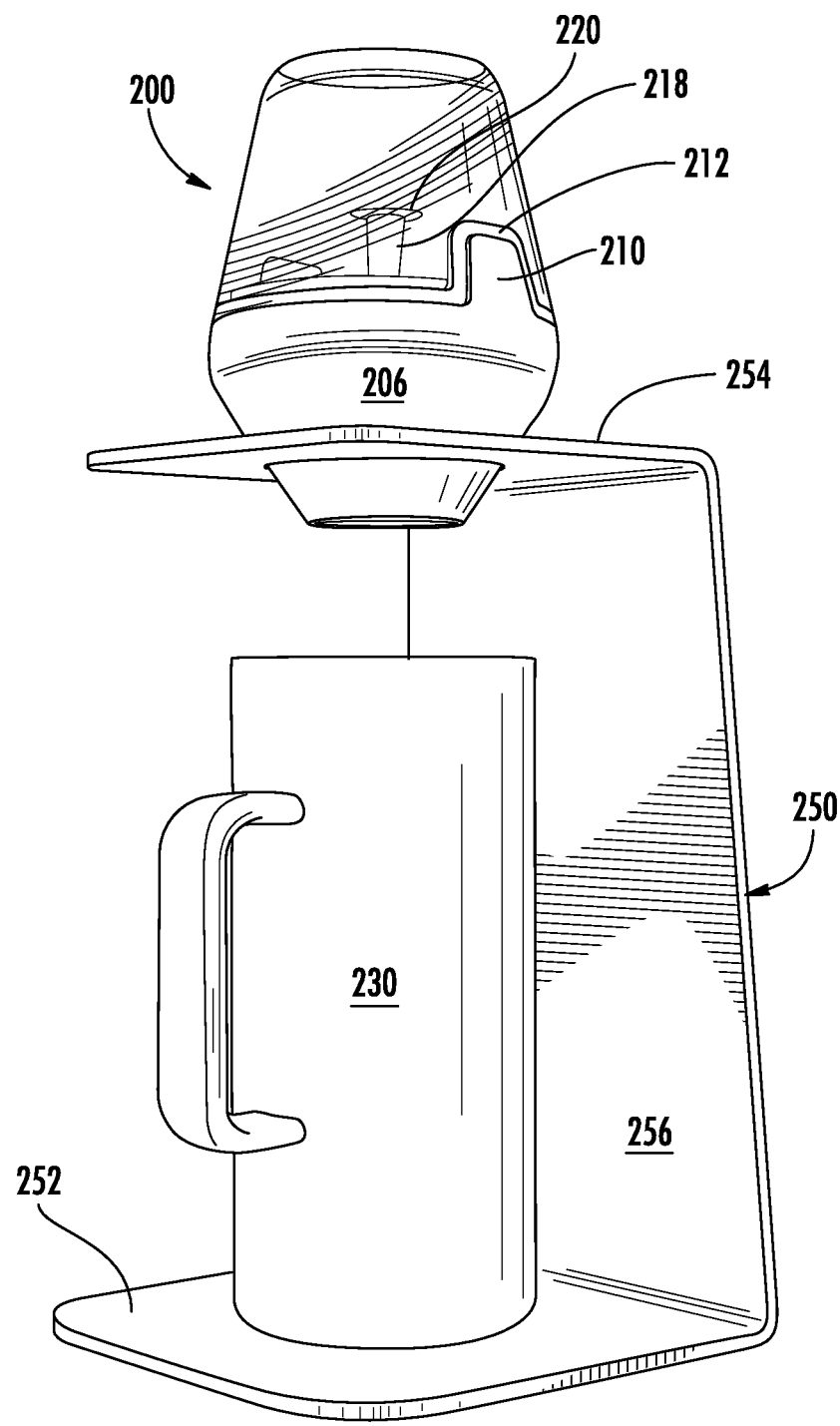
FIG. 26 is a perspective view of another aspect of the present disclosure showing a shaped gravity filter assembly held above a liquid retaining vessel where the liquid retaining vessel is positioned under a dispensing shelf.

FIG. 26 shows another embodiment that employs a stand 250 that has a base 252 that is substantially planar or planar and an upwardly extending shelf support wall 256 that operably engages the planar shelf 254 that is typically substantially parallel to the base 252. The shelf has at least one filter receiving aperture that receives the filter above a vessel loading location on the base.

Figure 27:
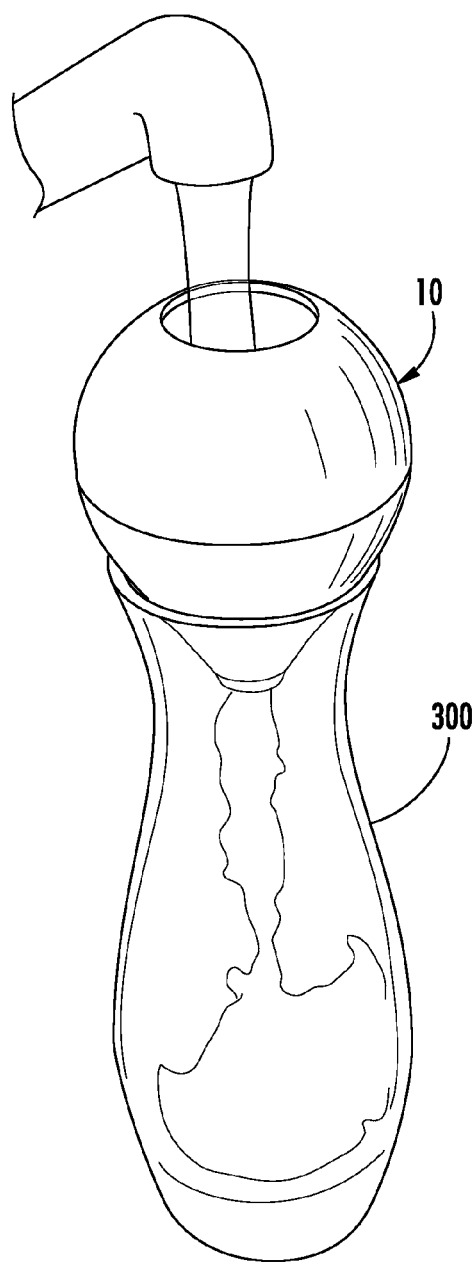
FIG. 27 is a drop-shaped gravity filter assembly according to another aspect of the present disclosure being filled with water from a facet and filtered water dispensed into a beverage container.
Figure 28:
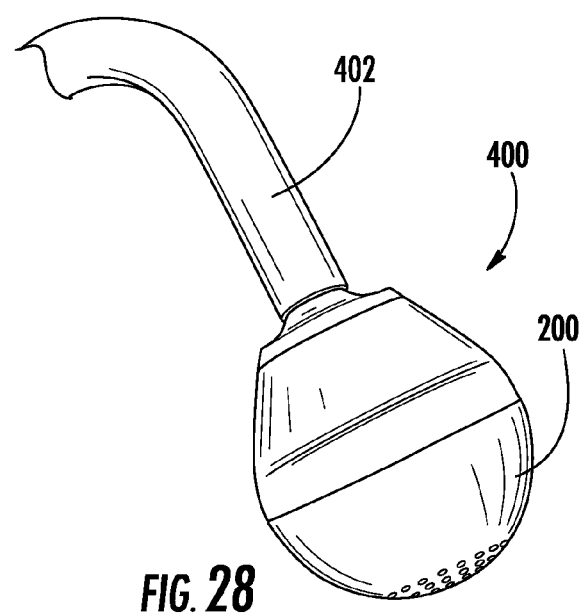
FIG. 28 is a side view of another aspect of the drop-shaped gravity filter assembly operably (threadably) engaged to a faucet.

FIG. 27 shows a smaller water bottle vessel 300 that receives the gravity filter assembly 10 within the opening of the bottle vessel 300 such that it is frictionally held in place by the rim of the vessel and the shape of the bottom portion of the filter. The sloped nature of the bottom portion of the filter facilitates in engagement with a plurality of vessels. Alternatively, differently sized adapters may be used and receive filters of the present disclosure. The filter may be a universal filter that can be engaged with multiple adapters. Additionally, as shown in FIG. 28, the filter 400 according to another aspect of the present disclosure may be directly engaged, typically threadably engaged, in a watertight sealed manner to a faucet 402. The filter media within the filter that treats water according to the embodiments of FIGS. 27 and 28 may be used so long as the pressure does not exceed atmospheric pressure plus the height of the water within the filter and/or a water flow rate that is slow enough to still effectively treat water passing through or coming into contact with the filter media.

Figure 29:
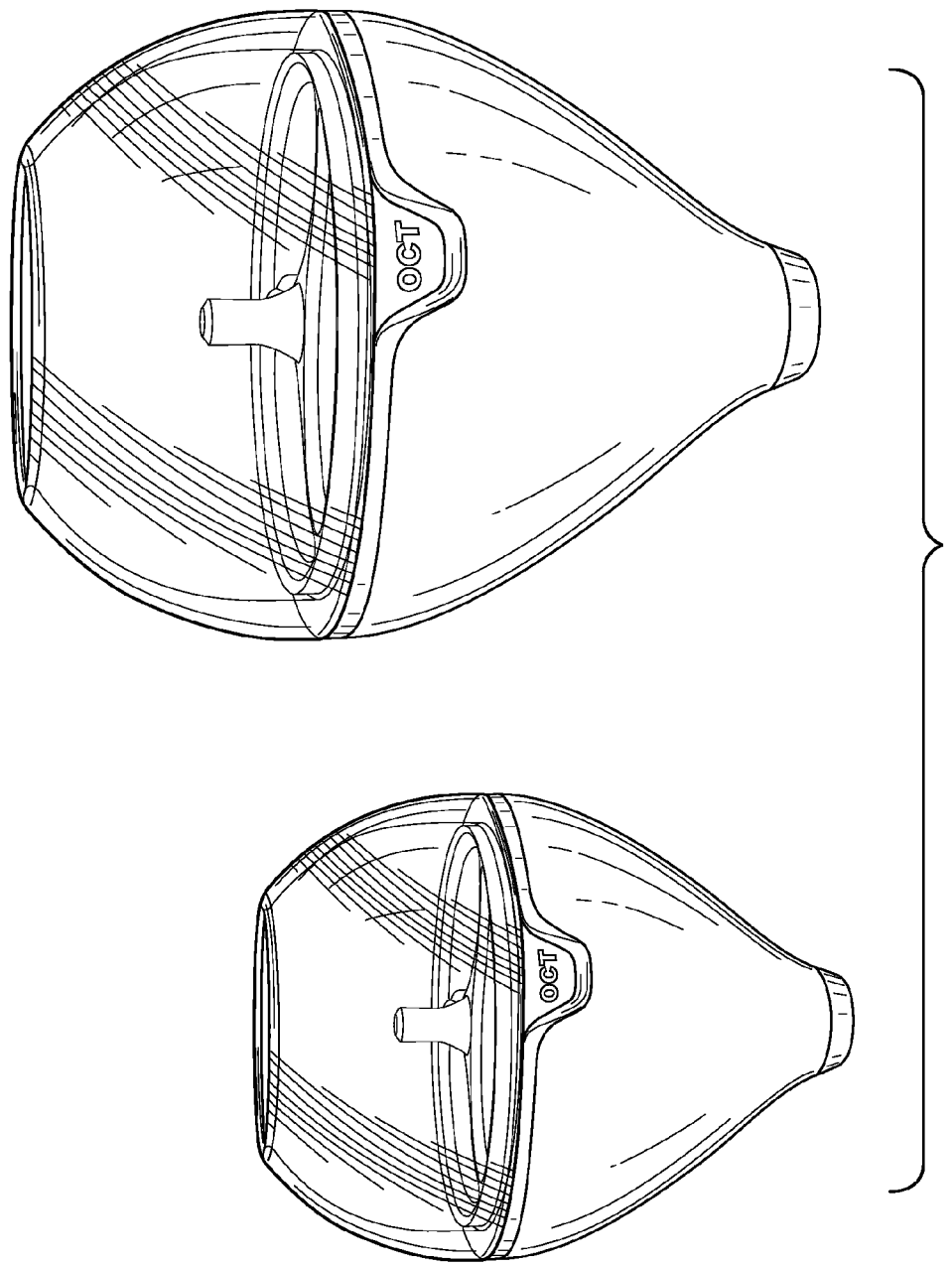
FIG. 29 is a perspective view showing alternatively sized drop-shaped gravity filters according to the present disclosure that are sized to fit variously sized vessel openings.

FIG. 29 shows that the drop-shaped gravity filter assembly 10 may be sized and configured to engage vessels with multiple different sized openings. The smaller filter on the left of the Figure may be used to fill smaller vessels with treated fluids, typically water, and the larger filter on the right may be used to fill larger vessels. Filters of the present disclosure may be configured of any size. The filters may engage any size vessel.

Figure 30:
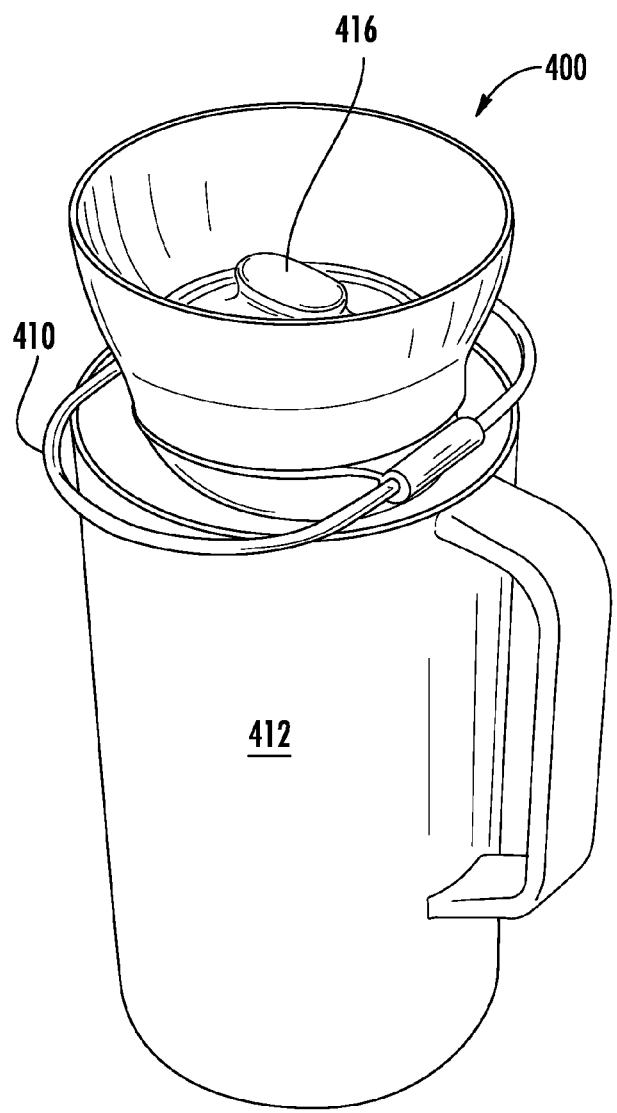
FIG. 30 is an alternative embodiment of the gravity filter assembly of the present disclosure suspended using a substantially elliptical frame to suspend the gravity filter assembly over the opening of the vessel.
Figure 31:
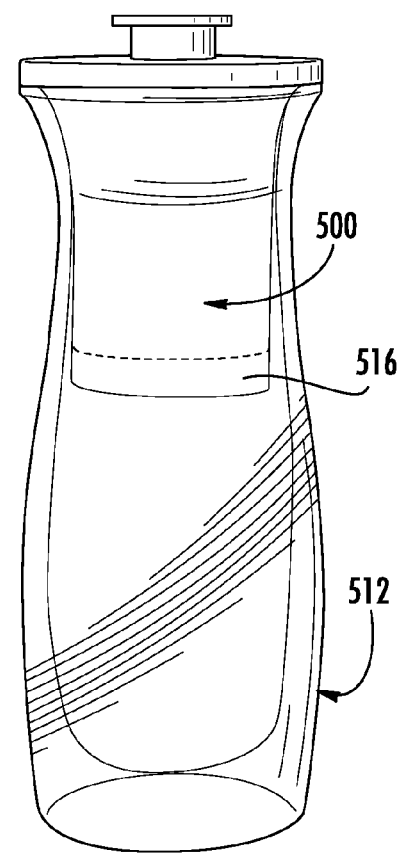
FIG. 31 is an elevated front view of a vessel with the filter spaced within an adapter that extends into the vessel.
Figure 32:
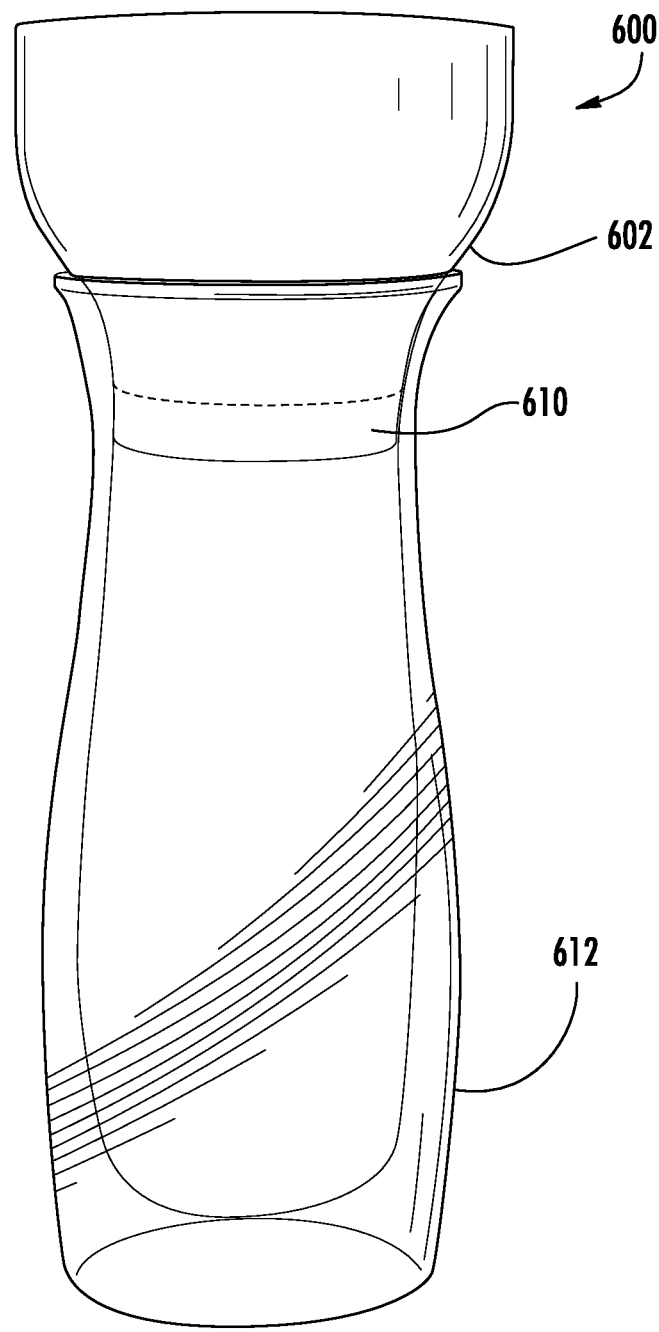
FIG. 32 is a perspective view of a vessel with a filter and adapter engaged to the vessel opening.
Figure 33:
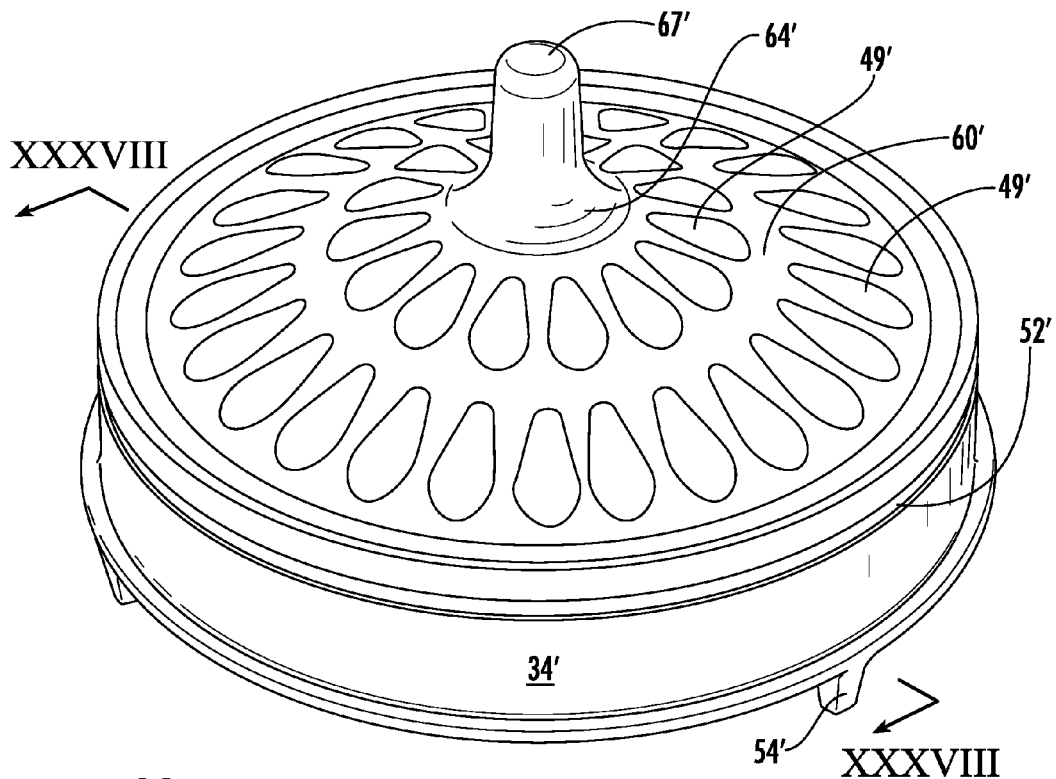
FIG. 33 is a perspective view of the filter according to another aspect of the present disclosure.
Figure 34:
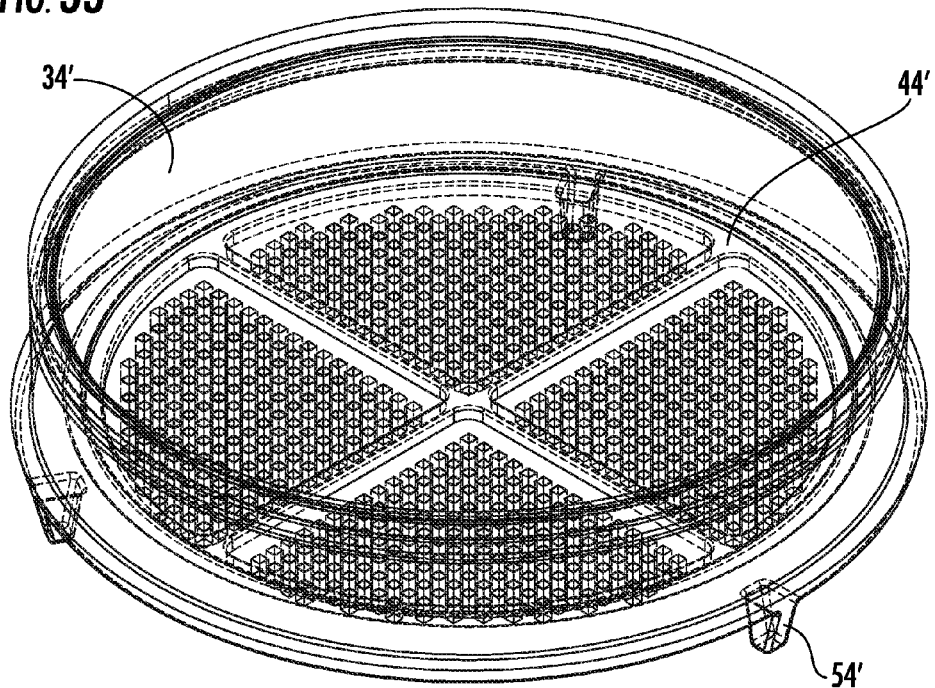
FIG. 34 is a perspective view of the filter shown in FIG. 26 with the top cap portion removed.
Figure 35:
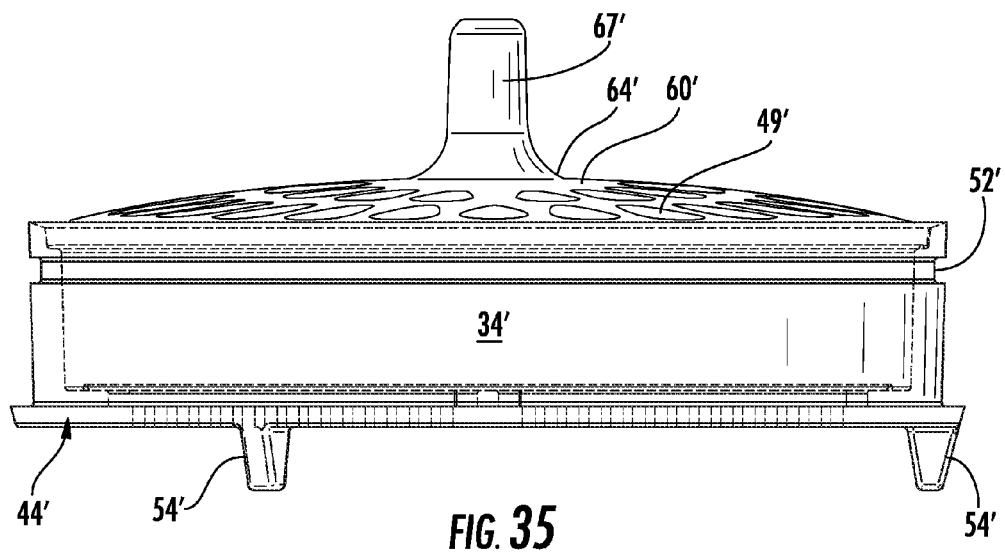
FIG. 35 is an elevated side view of the filter shown in FIG. 26.
Figure 36:
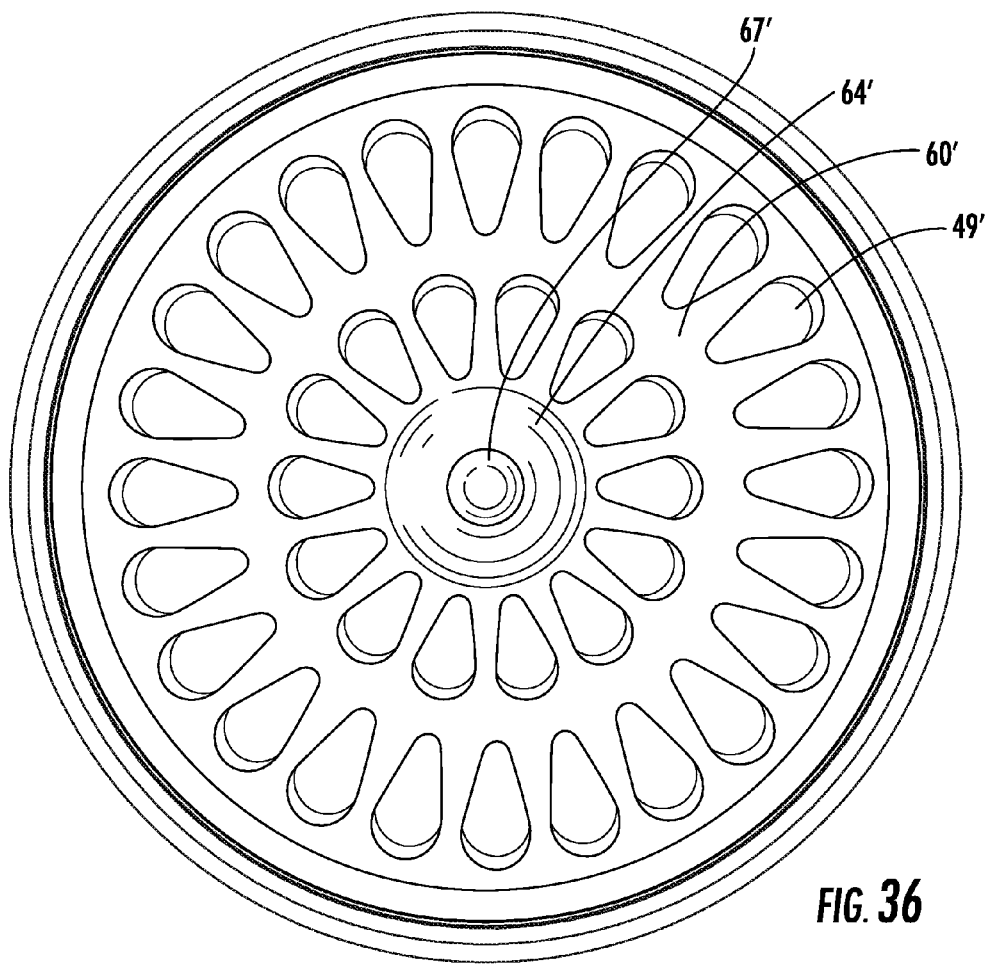
FIG. 36 is a top view of the filter shown in FIG. 33.

FIG. 30 is an alternative embodiment of the gravity filter assembly 400 of the present disclosure suspended using a substantially elliptical frame 410 to suspend the gravity filter assembly 400 over the opening of the vessel 412. Typically, the filter 416 is engaged with the filter and an adapter that is contoured to engage a plurality of differently sized vessels. As shown in FIG. 31, the adapter 500 may include a user removable filter 516 and configured such that the top edge of the adapter is the top of the vessel, which is depicted as a pitcher 512. An alternative adapter 600 is shown in FIG. 32. The adapters, which are a modification of a filter of the present disclosure, each engage the universal filters such that a user can use the same filter in a plurality of differently sized adapters to enable the user to fill a multitude of vessels with differently sized filling apertures. The adapters typically have differently sized sloped water receiving portions 602 and receive the filters in the bottom portion of the adapter. In the broadest sense, the gravity filters described herein may be considered an adapter according to the present disclosure.

An alternative filter 16' of the present disclosure is shown in FIGS. 33-39. The filter top 60' is domed shaped. A mesh material 43' is typically engaged with the top of the filter side wall section 34', for example within a slot (not shown) that runs about the interior perimeter surface of the filter side wall section 34'. The mesh screen material 43' across the top of the filter and beneath the domed filter top 60' is typically constructed of stainless steel or a plastic material such as polypropylene or polyethylene or other thermoplastic polymer material. The mesh is constructed and engaged with the filter side wall such that it is capable and configured to expand upward into the domed section if the filter material 48' expands. The top mesh 43' may be heat staked to the side wall section. Alternatively, it could be positioned within a slot described above. The mesh material may also be less than taut across the top of the filter in order to further facilitate this expansion. When engaged within a slot, the expansion may also be facilitated by the mesh screen's engagement to the side wall section 34' such that it laterally moves, if necessary, within a slot on the interior surface of the side wall as the mesh screen expands while still retaining the filter material. The filter material 48' may be loose media and not a compressed media.

The side wall section 34' is integral with the filter base 44' according to this aspect of the present disclosure. The side wall section 34' and the base 44' are typically injection molded thermoplastic material such as polypropylene or polyethylene. These components form a "can" like structure with a generally U-shaped cross-section. The mesh component 43' positioned at the base is typically integrally engaged to the base and molded into the base. The mesh may be constructed of any of the materials discussed above that might be used for the screen on the top of the filter.

Figure 38:
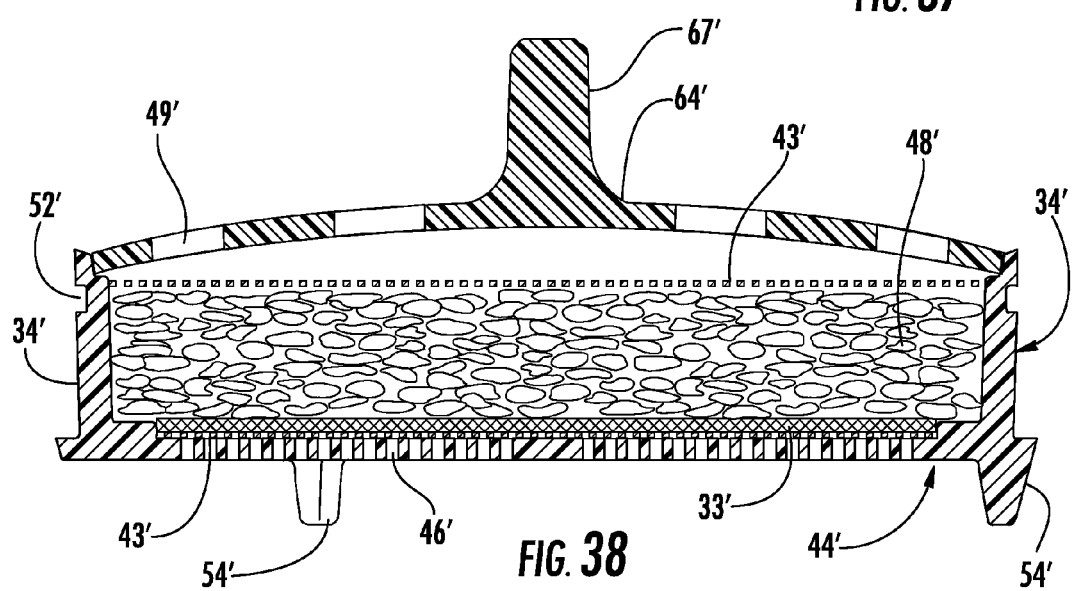
FIG. 38 is a cross-section view of the filter of FIG. 33 taken along line XXXII-XXXII.

As shown in FIG. 38, the filter may also employ an open cell polyethylene expansion block 33'. The open cell material could conceivably be another polymer material. This material's primary function is as a safeguard against damage caused by expansion of the filter material 48'. If the filter material 48' has already been hydrated and is a type of filter media that expands such that the filter media has already expanded into the domed portion of the filter, this material prevents damage if, for example, the filter in such a condition is placed into a freezing environment that would cause the water within the filter material to further expand as it becomes solid.

Figure 39:
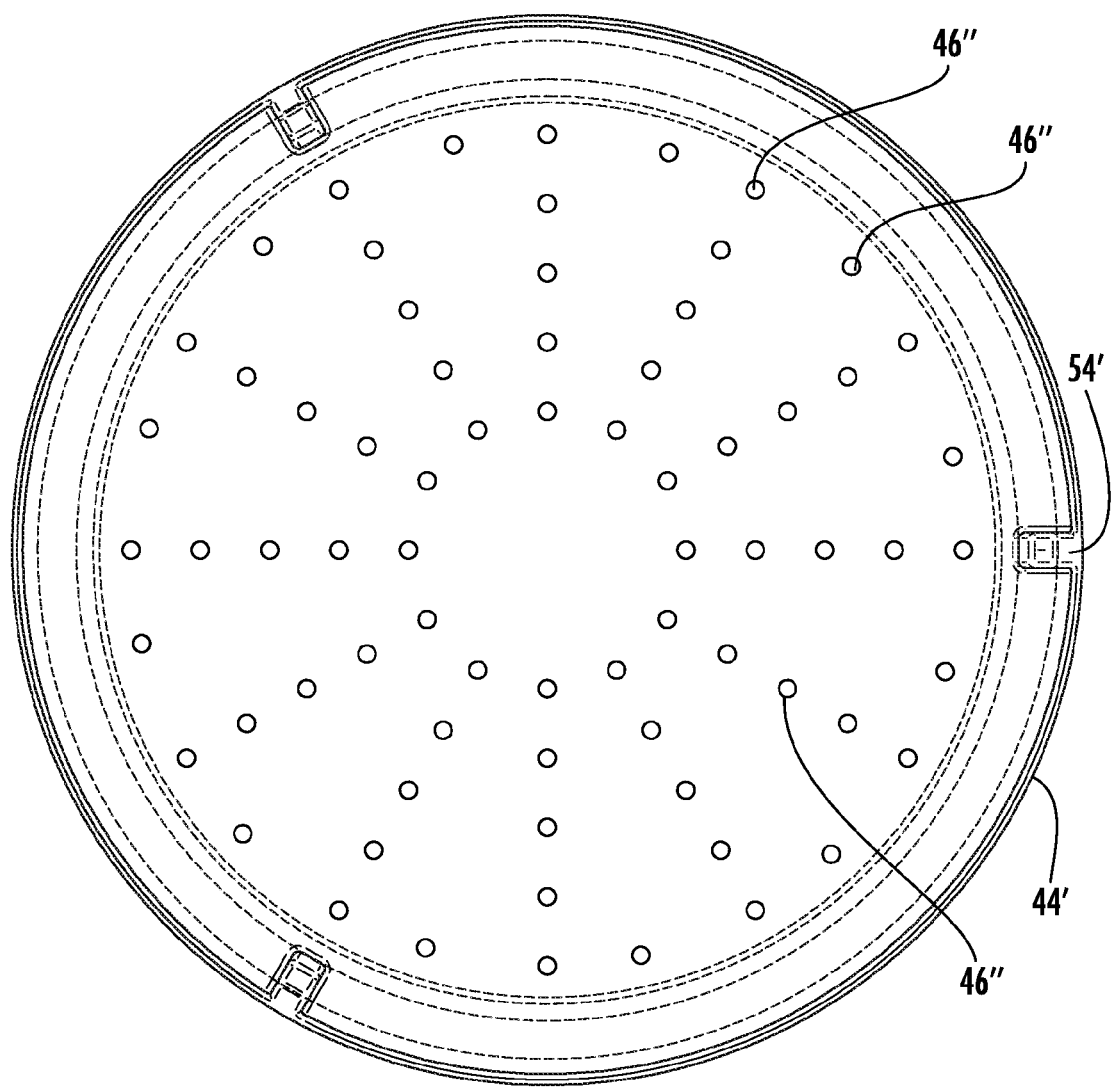
FIG. 39 is a bottom view of a filter, such as the filter shown in FIG. 33, according to another aspect of the present invention.

The apertures 49' in the domed filter top 60' are shown shaped as raindrops, but could be any shape desired. The apertures 46' in the base are typically smaller apertures that have a square cross-section with apertures having a diameter of from about 0.5 mm to about 2.0 mm, more typically from about 1.0 mm to about 2.0 mm. A slightly modified pattern of apertures 46" are shown in FIG. 39. The apertures of FIG.

39 are typically similarly sized as discussed above. The apertures are distributed in a generally spoked pattern about a central ring of apertures and have an outer ring of apertures around the peripheral portion of the base as shown in FIG. 39. This size and shape of aperture in the base (see FIG. 39) causes the filtered/treated water to fall into a vessel or into the bottom funnel portion in a manner that drips across the surface of the base and resembles rainfall.

The invention claimed is:

1. A gravity-driven fluid filtering system comprising:
a universal fluid filter comprising: at least one gravity-driven fluid filter media; a housing having an interior and at least one fluid inlet aperture configured to allow a fluid to be treated to enter the interior of the housing by a force of gravity and into contact with the at least one gravity-driven water filter media spaced within the interior of the housing; and at least one treated fluid outlet aperture configured to deliver treated fluid to at least one of a plurality of vessels each having a differently sized fluid receiving aperture;
a plurality of differently sized fluid dispensing adapters each comprising a universal fluid filter engagement location and a sloped and contoured fluid receiving universal fluid filter portion, which is different for each adapter, and spaced above the engagement location of the universal fluid filter and wherein the sloped and contoured fluid receiving portion is configured to engage a perimeter of a fluid receiving aperture of a given vessel and the interior of the sloped and contoured fluid receiving portion receives an untreated fluid prior to the fluid contacting the at least one gravity-driven filter media engaged with the adapter at the universal fluid filter engagement location;
wherein the fluid is water and at least one of the plurality of differently sized fluid dispensing adapters comprises:
a bottom portion having at least one treated water outlet, an upper perimeter, and a side wall that defines an interior of the bottom portion and wherein a bottom portion side wall is a shaped surface configured to frictionally engage a plurality of differently sized water vessel openings and still allow treated fluid to be delivered to the interior of a water vessel through the at least one treated water outlet; and
wherein the universal fluid filter is operably engaged with the bottom portion and spaced within the universal fluid filter engagement location and the at least one treated water outlet of the housing delivers treated water to an interior volume of the bottom portion and out of the at least one treated water outlet of the bottom portion; wherein the water filter is configured to reduce chlorine taste and odor components (CTO) per NSF 42 to a minimum of 60 gallons and allows for a water flow rate of at least about one liter per minute of flow through the water treatment medium under a force of gravity; and wherein the housing further includes at least one perimeter wall extending between the top and the bottom wherein the at least one perimeter wall has an exterior surface and at least one outwardly projecting lip positioned between the bottom of the universal fluid filter housing and about ⅔ of the distance up from the bottom toward the top of the universal fluid filter housing wherein the at least one outwardly projecting lip rests upon a shelf on the interior of the bottom portion and extends inwardly toward the interior of the bottom portion; and
wherein the adapter further comprises a top portion having an interior volume defined by at least one wall forming a curved exterior, at least one water inlet, and a bottom perimeter defining an opening and wherein the top portion of the adapter is configured to receive water from at least one water inlet and the bottom perimeter defines an opening that is configured to allow water from the at least one inlet to flow into contact with the at least one fluid inlet aperture of the universal fluid filter; and
wherein the universal fluid filter is configured to be removably engaged by hand without the use of tools from the bottom portion and the universal fluid filter, the bottom portion and the top portion are each configured to be removably engaged and disengaged to allow for replacement of the universal fluid filter and reassembly by hand and without the use of tools.

2. The gravity-driven fluid filtering system of claim 1, wherein the at least one perimeter wall has at least one visible indicator thereon that is visible through a cutout portion of the bottom portion of the adapter.

3. The gravity-driven fluid filtering system of claim 1, wherein the bottom portion of the adapter further comprises: an overmolded material that is matingly engaged with a host component of the bottom portion and the overmolded material is a separate plastic or elastomeric material, and the interior projecting shelf extending about the interior of the bottom portion and configured to engage the outwardly projecting lip of the fluid filter housing.

4. The gravity-driven fluid filtering system of claim 3, wherein filter housing is cylindrical and further comprises at least one or a plurality of tabular members extending downward from the outwardly projecting lip and away from the at least one perimeter wall and wherein the bottom portion further comprises a plurality of spaced apart tabular members that extend into the interior volume of the bottom portion and define spaces therebetween that are configured to receive the tabular members of the filter housing.

5. The gravity-driven fluid filtering system of claim 4, wherein the tabular members have an upper shelf that extends into the interior of the bottom portion and tapered sides extending downward toward a treated water outlet of the bottom portion and wherein the filter housing is removably engaged and disengaged with the bottom portion by hand and without the use of tools.

6. The gravity-driven fluid filtering system of claim 1, wherein the top portion has a perimeter rim section proximate the bottom perimeter wherein the perimeter rim section is indented a specific distance that defines a perimeter rim such that the top portion and the bottom portion create a substantially contiguous surface along the exterior of the at least one of the plurality of differently sized fluid dispensing adapters when the top portion and the bottom portion are engaged with one another; and
wherein the perimeter rim section has a plurality of outwardly extending tabs that are received in tab receiving gaps on an interior surface of the bottom portion and when the top portion is rotated the tabs are moved into engagement with grooves on the interior surface and proximate the tab receiving gaps and wherein the gravity-driven fluid treatment device is drop-shaped and the bottom portion is funnel shaped.

7. The gravity-driven fluid filtering system of claim 1, wherein the fluid filter medium is configured to treat water at a rate of at least about two liters per minute while removing at least chlorine odor and chlorine taste components from the water.

8. A gravity-driven water filtering system comprising:
a universal water filter comprising: at least one gravity-driven water filter media;
a housing having an interior, a top surface, a bottom surface and at least one perimeter wall extending between the top surface and the bottom surface wherein the top surface is planar and has a plurality of untreated water inlet apertures configured to allow untreated water to enter the interior of the housing by the force of gravity and into contact with the at least one gravity-driven water filter media spaced within the interior of the housing; and wherein the bottom surface is planar and has a plurality of treated water outlet apertures configured to deliver treated water therefrom;
a plurality of differently sized fluid dispensing adapters each comprising an universal water filter engagement location that receives the universal water filter and a sloped and contoured untreated water receiving portion, which is different for each adapter, and spaced above the universal water filter engagement location of the universal fluid filter and wherein the sloped and contoured untreated water receiving portion configured to engage a perimeter of the fluid receiving aperture of a given vessel and suspend the gravity-driven water filtering system such that treated water leaving the system is delivered to an interior of the given vessel; and
wherein a top of the sloped and contoured fluid receiving portion is wider than the engagement location and the sloped and contoured fluid portion is a curvilinear exterior surface of the adapter; and
wherein the at least one gravity-driven filter media is configured to treat water at a rate of at least about two liters per minute while removing at least chlorine odor and chlorine taste components from the water;
wherein the plurality of adapters each further comprise:
a bottom portion having at least one treated water outlet, an upper perimeter, and a bottom portion side wall that defines an interior volume of the bottom portion and wherein the bottom portion side wall is a shaped surface configured to frictionally engage a plurality of differently sized water vessel openings and still allow treated fluid to be delivered to the interior of a water vessel through the at least one treated water outlet; and
wherein the universal fluid filter is operably engaged with the bottom portion and the at least one treated water outlet of the housing delivers treated water to the interior volume of the bottom portion and out of the at least one treated water outlet of the bottom portion wherein the water filter is configured to reduce chlorine taste and odor components (CTO) per NSF 42 to a minimum of 60 gallons and allows for a water flow rate of at least about two liter per minute of flow through the water treatment medium under a force of gravity and wherein the housing further includes at least one perimeter wall extending between the top and the bottom wherein the at least one perimeter wall has an exterior surface and at least one outwardly projecting lip positioned between the bottom of the universal fluid filter housing and about $2/3$ of the distance up from the bottom toward the top of the universal fluid filter housing wherein an outwardly projecting lip rests upon a shelf on the interior of the bottom portion and extends inwardly toward the interior of the bottom portion; and
wherein the adapter further comprises a top portion having an interior volume defined by at least one wall forming a curved exterior, at least one water inlet, and a bottom perimeter defining an opening and wherein the top portion of the adapter is configured to receive water from at least one water inlet and the bottom perimeter defines an opening that is configured to allow water from the at least one inlet to flow into contact with the at least one fluid inlet aperture of the universal fluid filter; and
wherein the universal fluid filter is configured to be removably engaged by hand without the use of tools from the bottom portion and the universal fluid filter, the bottom portion and the top portion are each configured to be removably engaged and disengaged to allow for replacement of the universal fluid filter and reassembly by hand and without the use of tools.

* * * * *